(12) United States Patent
Zhang et al.

(10) Patent No.: US 10,880,889 B2
(45) Date of Patent: Dec. 29, 2020

(54) NARROWBAND USER EQUIPMENT (UE) SUPPORT WITH MULTI-CHANNEL LISTEN-BEFORE-TALK (LBT)

(71) Applicant: QUALCOMM INCORPORATED, San Diego, CA (US)

(72) Inventors: Xiaoxia Zhang, San Diego, CA (US); Yisheng Xue, San Diego, CA (US); Aleksandar Damnjanovic, Del Mar, CA (US); Jing Sun, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/554,194

(22) Filed: Aug. 28, 2019

(65) Prior Publication Data
US 2020/0100247 A1  Mar. 26, 2020

Related U.S. Application Data

(60) Provisional application No. 62/736,838, filed on Sep. 26, 2018.

(51) Int. Cl.
*H04W 72/04* (2009.01)
*H04W 16/14* (2009.01)
(Continued)

(52) U.S. Cl.
CPC ....... *H04W 72/0446* (2013.01); *H04L 5/0051* (2013.01); *H04W 16/14* (2013.01); *H04W 72/042* (2013.01); *H04W 74/0808* (2013.01)

(58) Field of Classification Search
CPC .......... H04W 72/0446; H04W 72/042; H04W 16/14; H04W 74/0808; H04L 5/0051
(Continued)

(56) References Cited

U.S. PATENT DOCUMENTS 10,201,014 B2 *  2/2019  Kadous ............. H04W 72/0446
2014/0341018 A1 * 11/2014  Bhushan ................... H04L 5/14
370/230
(Continued)

OTHER PUBLICATIONS

International Search Report and Written Opinion—PCT/US2019/048727—ISA/EPO—dated Nov. 17, 2019.

*Primary Examiner* — William Nealon
(74) *Attorney, Agent, or Firm* — Liem T. Do

(57) ABSTRACT

Wireless communications systems and methods related to communications with narrowband wireless communication devices over a wide frequency band are provided. A first wireless communication device transmits a first configuration indicating a first set of channel monitoring occasions for a first channel and a second set of channel monitoring occasions for a second channel. The first wireless communication device transmits, in the first channel based on at least a listen-before-talk (LBT) in the first channel, a first occupancy indication signal indicating a first transmission opportunity (TXOP) in the first channel. The first wireless communication device transmits, in the first channel based on the first configuration, a second occupancy indication signal associated with the first TXOP in the first channel during a channel monitoring occasion of the first set of channel monitoring occasions within the first TXOP.

26 Claims, 13 Drawing Sheets

(51) Int. Cl.
*H04L 5/00* (2006.01)
*H04W 74/08* (2009.01)

(58) Field of Classification Search
USPC .......................................................... 455/454
See application file for complete search history.

(56) References Cited

U.S. PATENT DOCUMENTS

2016/0345206 A1* 11/2016 Yerramalli .......... H04W 72/042
2017/0230970 A1*  8/2017 Kim ...................... H04W 74/08
2017/0272200 A1*  9/2017 Dinan .................. H04W 72/042
2018/0132198 A1*  5/2018 Zhang ................... H04W 16/14

* cited by examiner

NARROWBAND USER EQUIPMENT (UE) SUPPORT WITH MULTI-CHANNEL LISTEN-BEFORE-TALK (LBT)

CROSS REFERENCE TO RELATED APPLICATIONS

The present application claims priority to and the benefit of U.S. Provisional Patent Application No. 62/736,838, filed Sep. 26, 2018, which is hereby incorporated by reference in its entirety as if fully set forth below and for all applicable purposes.

TECHNICAL FIELD

This application relates to wireless communication systems, and more particularly to communications with narrowband wireless communication devices over a wide frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. Wideband operations have been considered in NR-U where the system bandwidth may be time-partitioned into multiple channels. For example, the system bandwidth may be about 80 MHz and may include about four 20 MHz channels. A BS may perform LBTs in one or more channels within the system bandwidth. Depending on the LBT outcomes, the BS may access one or more channels for communications with UEs. However, some UEs are narrowband wireless communication devices (e.g., narrowband Internet of thing (IoT) devices) with transmissions and/or receptions limited to a narrow bandwidth (e.g., of about 20 MHz), and thus may not be capable of monitoring all the channels in the system bandwidth simultaneously.

To monitor multiple channels in a wide system band, a narrowband UE may stay on one channel at a time and move from one channel to another channel. However, it is likely that a BS may gain access to one channel while the UE is monitoring another channel. As a result, the UE may only be served by the BS when the BS passes LBT in the monitoring channel of the UE. Thus, a wideband medium can be underutilized when narrowband UEs are limited to monitoring one channel at a time.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device, a first configuration indicating a first set of channel monitoring occasions for a first channel and a second set of channel monitoring occasions for a second channel; transmitting, by the first wireless communication device in the first channel based on at least a listen-before-talk (LBT) in the first channel, a first occupancy indication signal indicating a first transmission opportunity (TXOP) in the first channel; and transmitting, by the first wireless communication device in the first channel based on the first configuration, a second occupancy indication signal associated with the first TXOP in the first channel during a channel monitoring occasion of the first set of channel monitoring occasions within the first TXOP.

In an additional aspect of the disclosure, a method of wireless communication includes receiving, by a first wireless communication device from a second wireless communication device, a configuration indicating a first set of channel monitoring occasions for a first channel and a second set of channel monitoring occasions for a second channel; and monitoring, by the first wireless communication device, for a occupancy indication signal associated with a transmission opportunity (TXOP) in at least one of the first channel or the second channel during one or more channel monitoring occasions of the first set of channel monitoring occasions and the second set of channel monitoring occasions based on the configuration.

In an additional aspect of the disclosure, an apparatus includes a transceiver configured to transmit a first configuration indicating a first set of channel monitoring occasions for a first channel and a second set of channel monitoring occasions for a second channel; transmit, in the first channel based on at least a listen-before-talk (LBT) in the first channel, a first occupancy indication signal indicating a first transmission opportunity (TXOP) in the first channel; and transmit, in the first channel based on the first configuration, a second occupancy indication signal associated with the first TXOP in the first channel during a channel monitoring occasion of the first set of channel monitoring occasions within the first TXOP.

In an additional aspect of the disclosure, an apparatus includes a transceiver configured to receive, from a first wireless communication device, a configuration indicating a first set of channel monitoring occasions for a first channel and a second set of channel monitoring occasions for a second channel; and a processor configured to monitor for an occupancy indication signal associated with a transmission opportunity (TXOP) in at least one of the first channel or the second channel during one or more channel monitoring occasions of the first set of channel monitoring occasions and the second set of channel monitoring occasions based on the configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
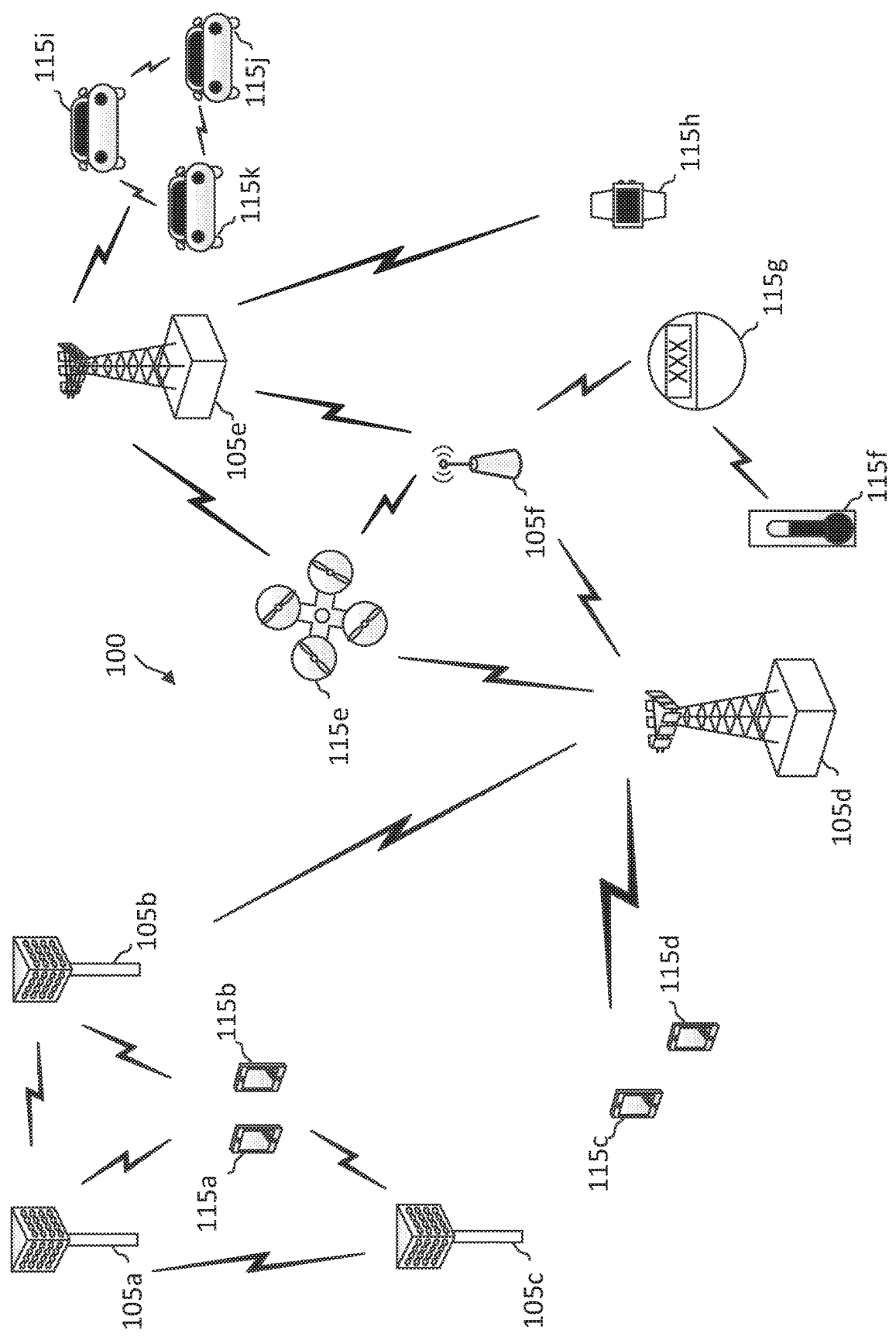
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for improving medium utilization efficiency when serving narrowband wireless communication devices over a wide frequency band in an unlicensed spectrum or shared spectrum. The disclosed embodiments synchronize BS's channel occupancy indications with narrowband UEs' channel monitoring. For example, a BS may configure a UE with a set of channel monitoring occasions for each channel in the wide frequency band. The channel monitoring occasions refer to time instances or recurring time periods when a UE may perform channel monitoring. The channel monitoring occasions in the different channels may interleave in time to allow a UE to switch between the channels during channel monitoring. The BS may perform a multi-channel LBT to determine whether the channels are available for transmissions. When LBT passes in a channel, the BS transmits an initial channel occupancy indication signal indicating the beginning of a TXOP in the channel. To facilitate the synchronized channel monitoring, the BS repeats the channel occupancy indication during the TXOP based on the configured monitoring configuration. For example, the BS transmits another channel occupancy indication signal similar to the initial channel occupancy indication signal during a channel monitoring occasion for the channel within the TXOP based on the configuration. A UE may monitor for a channel occupancy indication signal in the channels by switching between the channels and monitoring the channels in corresponding channel monitoring occasions as configured by the BS based on the configuration.

In an embodiment, the UE may monitor for a channel occupancy indication signal in a channel during a channel monitoring occasion configured for the channel. When the UE fails to detect or decode a channel occupancy indication signal in the channel, the UE may switch to another channel and monitor for a channel occupancy indication signal in the other channel during a channel monitoring occasion configured for the other channel. However, when the UE successfully detects a channel occupancy indication signal in a channel, the UE may stay on the channel and the BS may serve the UE on the channel.

In an embodiment, a channel occupancy indication signal may include timing information (e.g., a remaining channel occupancy time (COT)) associated with a corresponding TXOP. After a UE detected a channel occupancy indication signal in a channel, the UE may continue to monitor the channel for a communication from the BS. The UE may switch to monitor another channel after the TXOP has ended based on the timing information.

In an embodiment, the BS may configure the UE with a channel monitoring switch timer configuration. After the UE detected a channel occupancy indication signal in a channel, the UE may monitor for a communication schedule from the BS. The UE may start a timer according to the timer configuration and may switch to monitor another channel when the timer expires.

In an embodiment, when the multi-channel LBT indicates two or more channels are available, the BS may transmit an initial channel occupancy indication signal in each available channel. The BS may repeat the channel occupancy indication in each channel during a corresponding TXOP based on the configured monitoring configuration. The BS may not be aware of which channel the UE may tune to. Thus, when the UE detects a channel occupancy indication signal in a channel, the UE may report the detection to the BS. The BS may monitor for a detection report from the UE in each available channel. The BS may serve the UE on a channel where a detection report is received from the UE. The BS may also request the UE to switch to another available channel, for example, due to traffic loads, channel conditions, and/or other scheduling decisions.

Aspects of the present application can provide several benefits. For example, the synchronization between BS's channel occupancy indications and UEs' channel monitoring can reduce the probability of missed channel occupancy indication detections at narrowband UEs. Thus, the disclosed embodiments can improve medium utilization efficiency when serving narrowband UEs on a wideband with multi-channel LBTs.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes, the BS 105 may schedule a UE 115 for communications over the shared channel.

Figure 2:
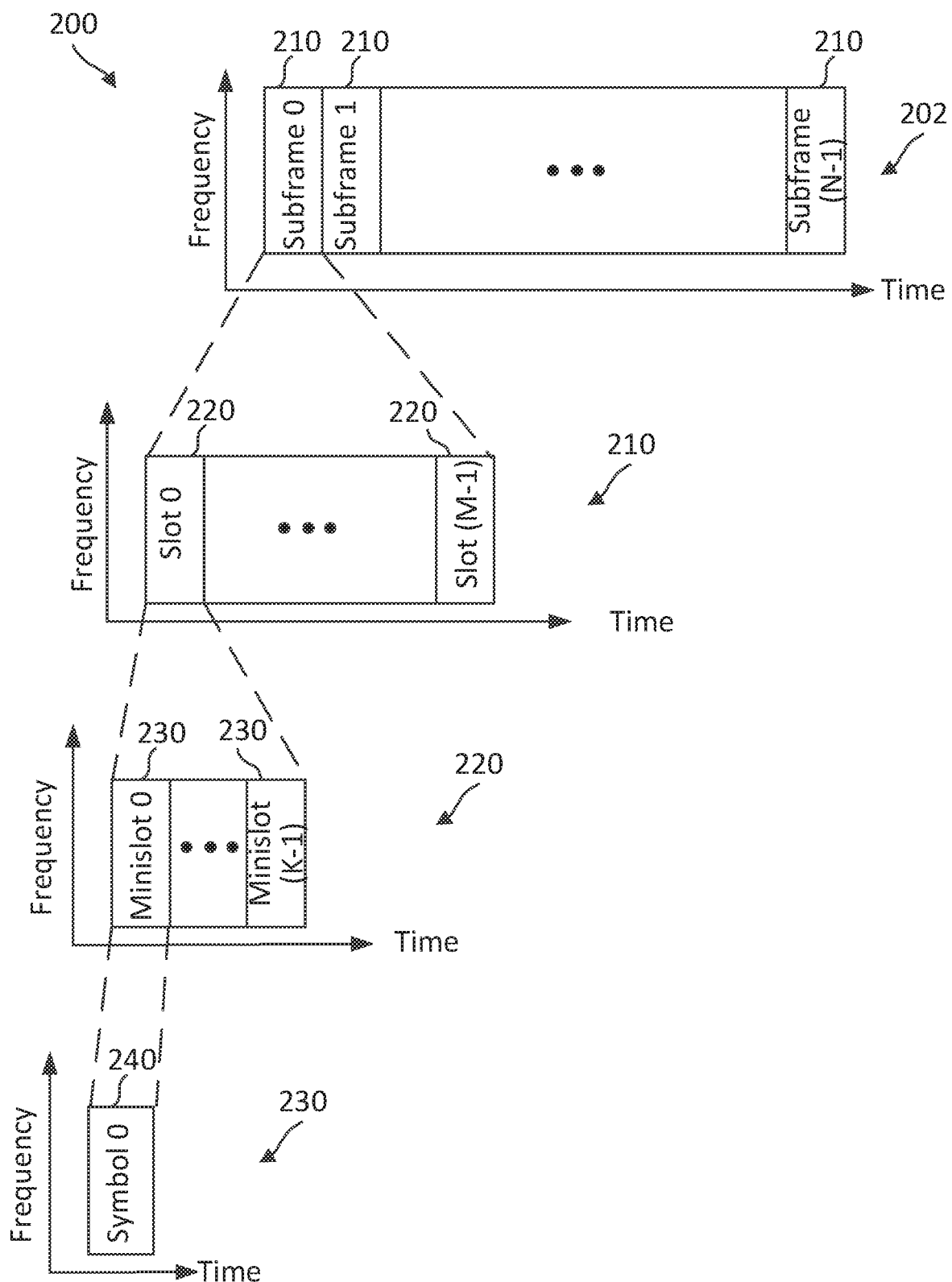
FIG. 2 illustrates a communication frame configuration according to some embodiments of the present disclosure.

FIG. 2 illustrates a communication frame configuration 200 according to embodiments of the present disclosure. The configuration 200 may be employed by a network such as the network 100. In particular, BSs such as the BSs 105 and UEs such as the UEs 115 may communicate with each other using the configuration 200. In FIG. 2, the x-axes represent time in some constant units and the y-axes represent frequency in some constant units. The configuration 200 includes a radio frame 202. The radio frame 202 includes N plurality of subframes 210 spanning in time and frequency.

In an embodiment, a radio frame 202 may span a time interval of about 10 milliseconds (ms). Each subframe 210 includes M plurality of slots 220. Each slot 220 includes K plurality of mini-slots 230. Each mini-slot 230 may include a variable number of symbols 240. N, M, and K may be any suitable positive integers.

In some embodiments, a radio frame 202 may include about 10 subframes 210. Each subframe 210 may include about 14 symbols 240. Each subframe 210 may include about 2 slots 220. Each slot 220 may include about 7 symbols 240. Each mini-slot 230 may include between about 1 symbol 240 to about 7 symbols 240. A BS may schedule a UE for communications in units of subframes 210, slots 220, and/or mini-slots 230. In some instances, each subframe 210 may include a duration of about 1 millisecond (ms) and each slot 220 may include a duration of about 500 µs.

Figure 3:
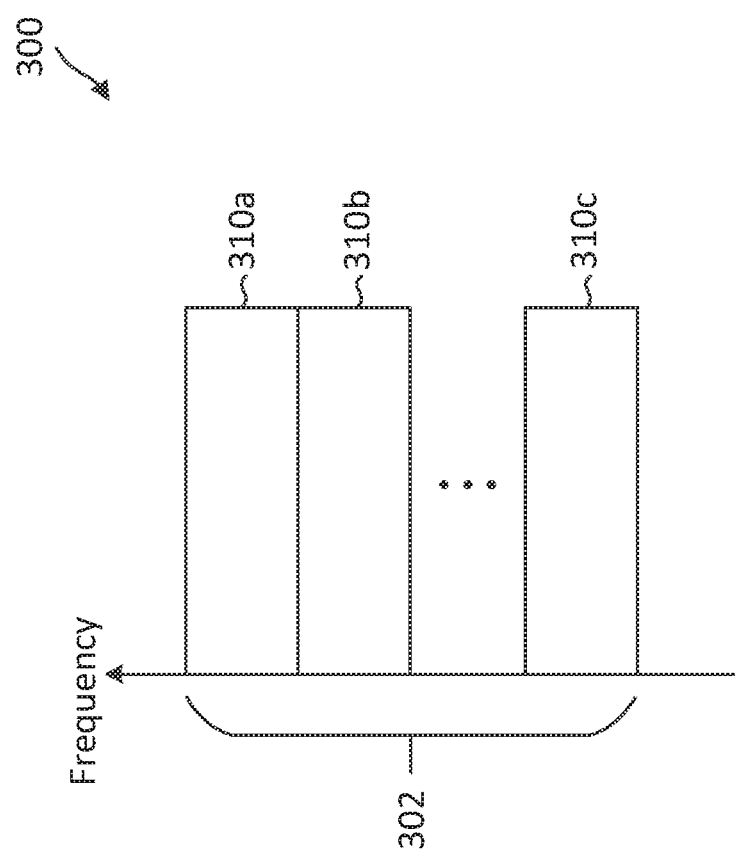
FIG. 3 illustrates a multi-channel configuration according to some embodiments of the present disclosure.

FIG. 3 illustrates a multi-channel deployment configuration 300 according to some embodiments of the present disclosure. The configuration 300 may be employed by a network such as the network 100. In particular, BSs such as the BSs 105 and UEs such as the UEs 115 may communicate with each other using the configuration 300. In some instances, the configuration 300 can be employed in conjunction with the configuration 200. In FIG. 3, the y-axis represents frequency in some constant units. The configuration 300 includes a system bandwidth 302, for example, in an unlicensed spectrum or a shared spectrum where the network may be deployed. The system bandwidth 302 may be divided into a plurality of channels 310 shown as 310a, 310b, and 310c. In some examples, the system bandwidth 302 may be about 80 MHz wide and may be divided into about four channels 310 of about 20 MHz each. However, the system bandwidth 302 may be alternatively configured to include any suitable bandwidth and any suitable number of channels 310.

A BS may perform an LBT in each of the channels 310. The LBT may include energy detection and/or signal decoding. Depending on the outcomes of the LBTs, the BS may access one or more of the channels 310. Upon gaining access (e.g., a TXOP) to a channel 310, the BS may transmit a reservation signal at the beginning of the TXOP to indicate that the TXOP is reserved. The reservation signal may include a predetermined sequence and/or any information related to the TXOP or scheduling in the TXOP. The reservation signal can serve as a channel occupancy indicator or TXOP indicator to UEs served by the BS. For example, a UE served by the BS can monitor a channel 310 for a reservation signal to determine whether the serving BS has gained access to the channel 310. If the serving BS has gained access to the channel 310, the UE may further monitor the channel 310 for a communication schedule from the BS. In some other instances, the reservation signal can include a communication schedule for the UE.

In some embodiments, the UE may be a narrowband wireless communication device and may not be capable of monitoring all the channels 310 in the system bandwidth 302 simultaneously. Instead, the UE may monitor one channel 310 at a time. In some instances, the UE may monitor the channels 310 in a round robin manner, for example, by monitoring the channel 310a for a period of time and then switching to monitor a next channel 310b for a next period of time. However, when there is no coordination or synchronization between the BS and the UE in the monitoring periods, the likelihood of the UE monitoring one channel 310 (e.g., the channel 310a) while the BS gains access to another channel 310 (e.g., the channel 310c) may be high, resulting in a high missed detection rate at the UE. In addition, the UE may require a certain amount of time to switch between channels 310, and thus may further increase the chance of the UE missing a detection of a reservation signal or channel occupancy indication from the BS.

One approach to overcoming and/or reducing missed detections at a narrowband UE is to assign one of the channels 310 (e.g., the channel 310a) as a primary channel. The BS may always transmit a reservation signal or a channel occupancy indication signal in the primary channel Thus, the UE may only be required to monitor the primary channel. After the BS gained access to the primary channel, the BS can schedule the UE on the primary channel and/or one or more other channels 310 depending on LBTs in the other channels 310. In other words, the BS may only be able to send an indication to the UE when the BS can gain access to the primary channel. As such, while the use of a primary channel can overcome or reduce missed detections at narrowband UEs, the system performance can be highly dependent on the medium access in the primary channel, and thus may not achieve an optimum medium utilization.

Accordingly, the present disclosure provides techniques to allow a BS to synchronize channel occupancy indications with UEs' channel monitoring instead of relying on a primary channel for channel occupancy indications and monitoring.

Figure 4:
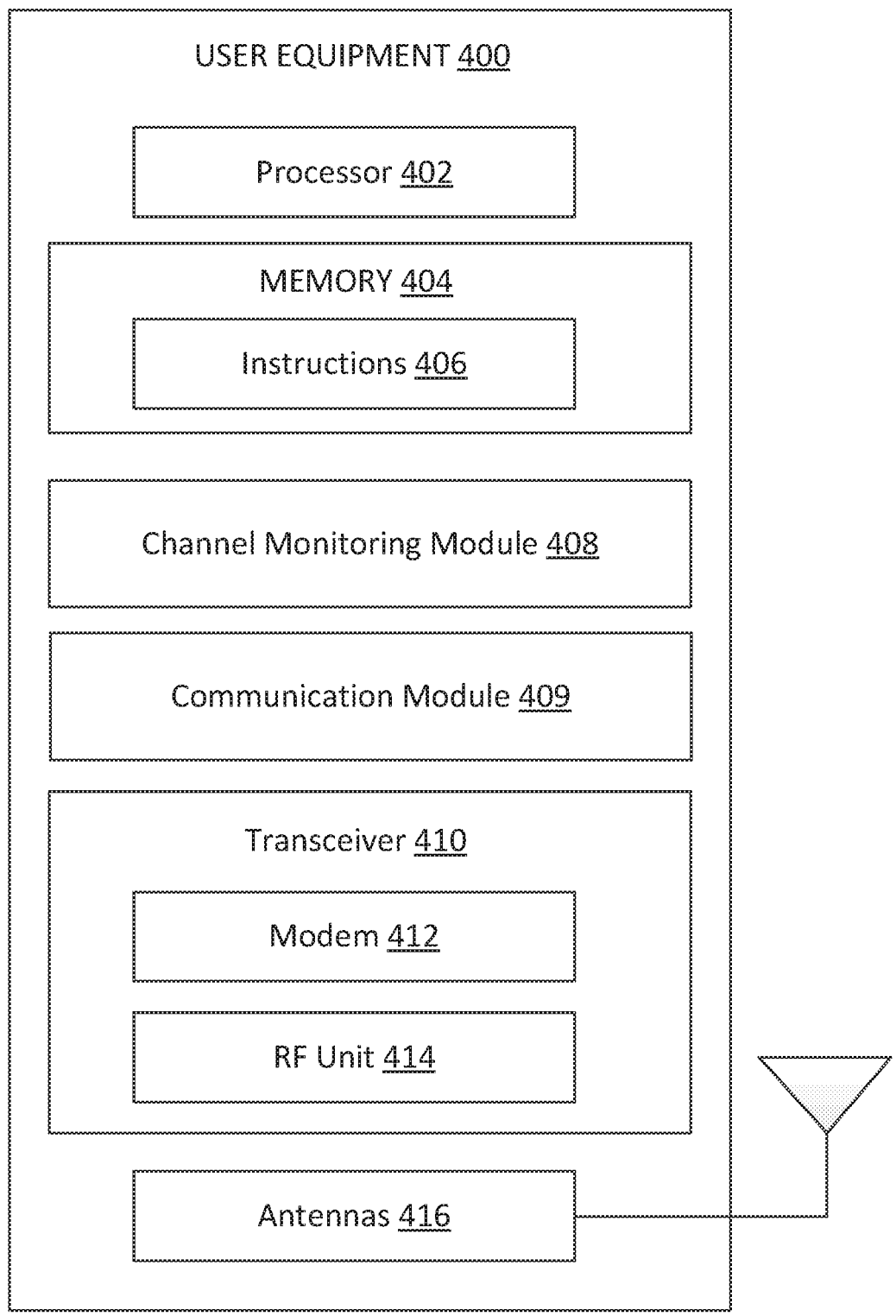
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 as discussed above in FIG. 1, for example. As shown, the UE 400 may include a processor 402, a memory 404, a channel monitoring module 408, a communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-11 and 13. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the channel monitoring module 408 and the communication module 409 may be implemented via hardware, software, or combinations thereof. For example, each of the channel monitoring module 408 and the communication module 409 may be implemented as a processor, circuit, and/or instructions 406 stored in the memory 404 and executed by the processor 402. Each of the channel monitoring module 408 and the communication module 409 may be used for various aspects of the present disclosure, for example, aspects of FIGS. 6-11 and 13.

In an example, the channel monitoring module 408 is configured to receive a configuration from a BS (e.g., the BSs 105) indicating at least a first set of channel monitoring periods for a first channel and a second set of channel monitoring periods for a second channel. The first channel and the second channel may be part of a wider system bandwidth (e.g., the system bandwidth 302). For example, the first channel may be the channel 310a and the second channel may be the channel 310b. The first set of channel monitoring periods may interleave with the second set of channel monitoring periods in time. The channel monitoring module 408 is configured to monitor for a channel occupancy indication signal (e.g., indicating that the BS has gained access or a TXOP to a corresponding channel) in the first channel and/or the second channel by switching the monitoring between the first channel and the second channel based on the received configuration. For example, the channel monitoring module 408 may monitor the first channel during a channel monitoring period of the first set of channel monitoring periods. When there is no channel occupancy indication signal detected, the channel monitoring module 408 may switch to monitor the second channel during a channel monitoring period of the second set of channel monitoring periods. Upon detecting a channel occupancy indication signal in the first channel or the second channel, the channel monitoring module 408 may stay on the corresponding channel and monitor for a communication schedule and/or a channel switch instruction from the BS.

In an embodiment, the channel occupancy indication signal may include a channel occupancy duration of the TXOP. Upon detecting a channel occupancy indication signal in the first channel or the second channel, the channel monitoring module 408 may continue to monitor for a communication schedule from the BS until the end of the TXOP.

In an embodiment, the channel monitoring module 408 may receive a timer configuration indicating an amount of time to stay on a channel before switching to another channel Thus, upon detecting a channel occupancy indication signal in the first channel or the second channel, the channel monitoring module 408 may configure a timer based on the timer configuration and may continue to monitor for communications from the BS until the timer expires.

In an example, the communication module 409 is configured to communicate with the BS based on communication schedules received from the BS. In an embodiment, upon detecting a channel occupancy indication signal in the first channel or the second channel, the communication module 409 may report the detection of a channel occupancy indication signal in a corresponding channel to notify the BS which channel the UE 400 is on. The communication module 409 may receive an instruction from the BS to switch to another channel, switch to the other channel based on the received instruction, and/or communicate with the BS on the other channel Mechanisms for synchronizing and communicating with a BS performing multi-channel LBTs are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the communication module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416. The RF unit 414 may be configured to tune to different channels (e.g., the channels 310).

Figure 5:
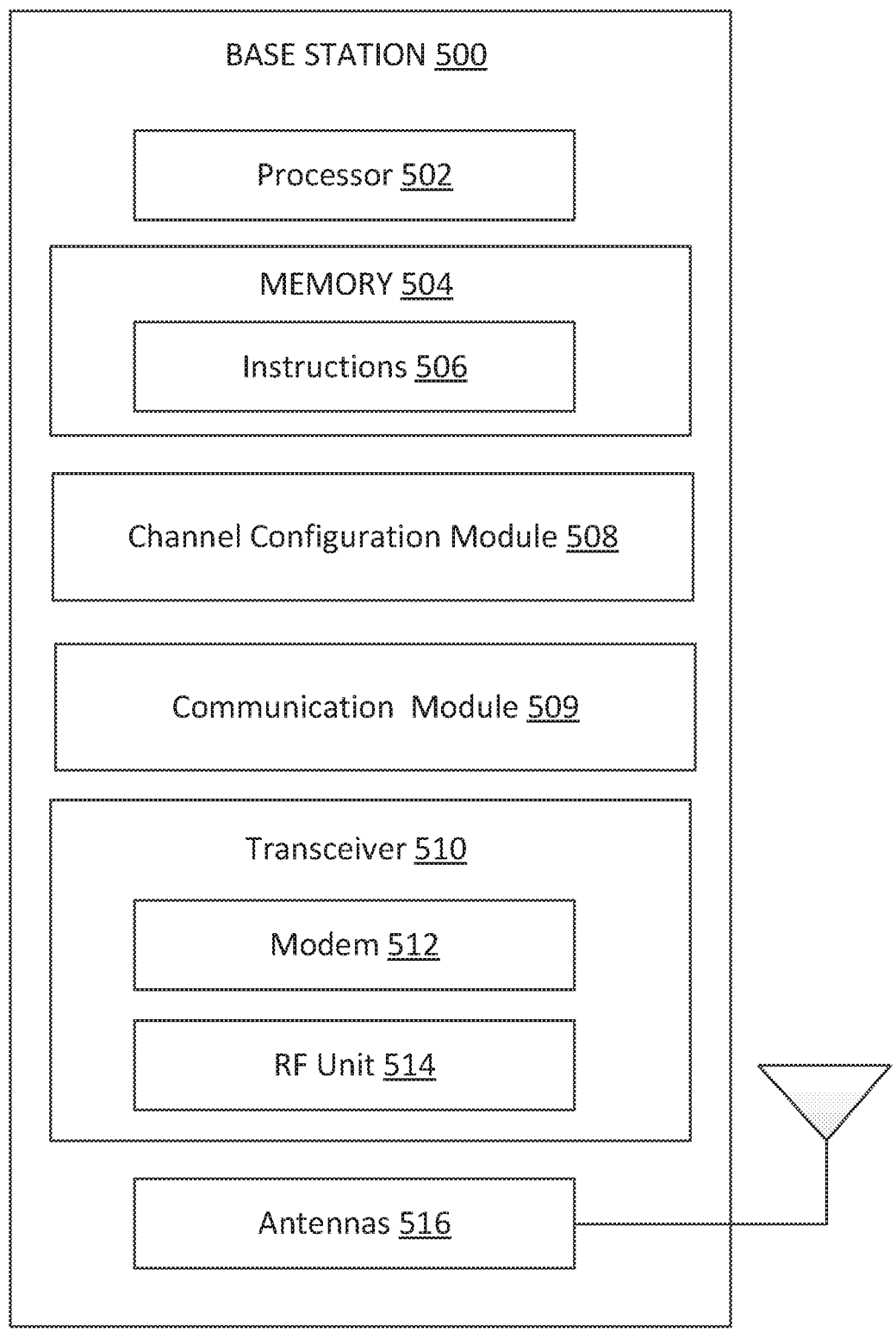
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 as discussed above in FIG. 1, for example. A shown, the BS 500 may include a processor 502, a memory 504, a channel configuration module 508, a communication module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-12. Instructions 506 may also be referred to as code, which may be interpreted broadly to include any type of computer-readable statement(s) as discussed above with respect to FIG. 4.

Each of the channel configuration module 508 and the communication module 509 may be implemented via hardware, software, or combinations thereof. For example, each of the channel configuration module 508 and the communication module 509 may be implemented as a processor, circuit, and/or instructions 506 stored in the memory 504 and executed by the processor 502. Each of the channel configuration module 508 and the communication module 509 may be used for various aspects of the present disclosure, for example, aspects of FIGS. 6-12.

In an example, the channel configuration module 508 is configured to transmit a configuration to a UE (e.g., the UEs 115 and 400) indicating at least a first set of channel monitoring periods for a first channel and a second set of channel monitoring periods for a second channel. The first channel and the second channel may be part of a wider system bandwidth (e.g., the system bandwidth 302). For example, the first channel may be the channel 310a and the second channel may be the channel 310b. The first set of channel monitoring periods may interleave with the second set of channel monitoring periods in time.

In an example, the communication module 509 is configured to perform multi-channel LBT, for example, by performing an LBT in the first channel and an LBT in the second channel Upon gaining access or a TXOP in the first channel or the second channel, the communication module 509 may transmit a first occupancy indication signal in a corresponding channel at the beginning of the TXOP to indicate the start of the TXOP. The TXOP may or may not begin at the boundary or the start of a transmission slot, thus the UE may not be monitoring for the first occupancy indication signal at the time when the first occupancy indication signal is transmitted. In order to support synchronized monitoring at the UE, the communication module 509 may repeat the indication of the presence of the TXOP in at least one channel monitoring period of the first set of channel monitoring periods within the TXOP.

In an embodiment, the communication module 509 may gain access to both the first channel and the second channel Thus, the communication module 509 may monitor for a report from the UE in both the first channel and the second channel to determine whether the UE is on the first channel or the second channel. Upon receiving a report from the UE, the communication module 509 may continue to communicate with the UE in a corresponding channel or instruct the UE to switch to the other channel Mechanisms for configuring UEs with monitoring periods such that UEs' monitoring can be synchronized to multi-channel LBTs are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links. The RF unit 514 may be configured to tune to different channels (e.g., the channels 310).

FIGS. 6-9 illustrate various mechanisms for synchronizing UEs' channel monitoring to BS's channel occupancy indications with multi-channel LBTs. In FIGS. 6-9, the x-axes represent time in some constant units and the y-axes represent frequency in some constant units. FIGS. 6-9 illustrate two channels 610 for simplicity of discussions, though it will be recognized that embodiments of the present disclosure may scale to include any suitable number of channels (e.g., about 3, 4 or more).

Figure 6:
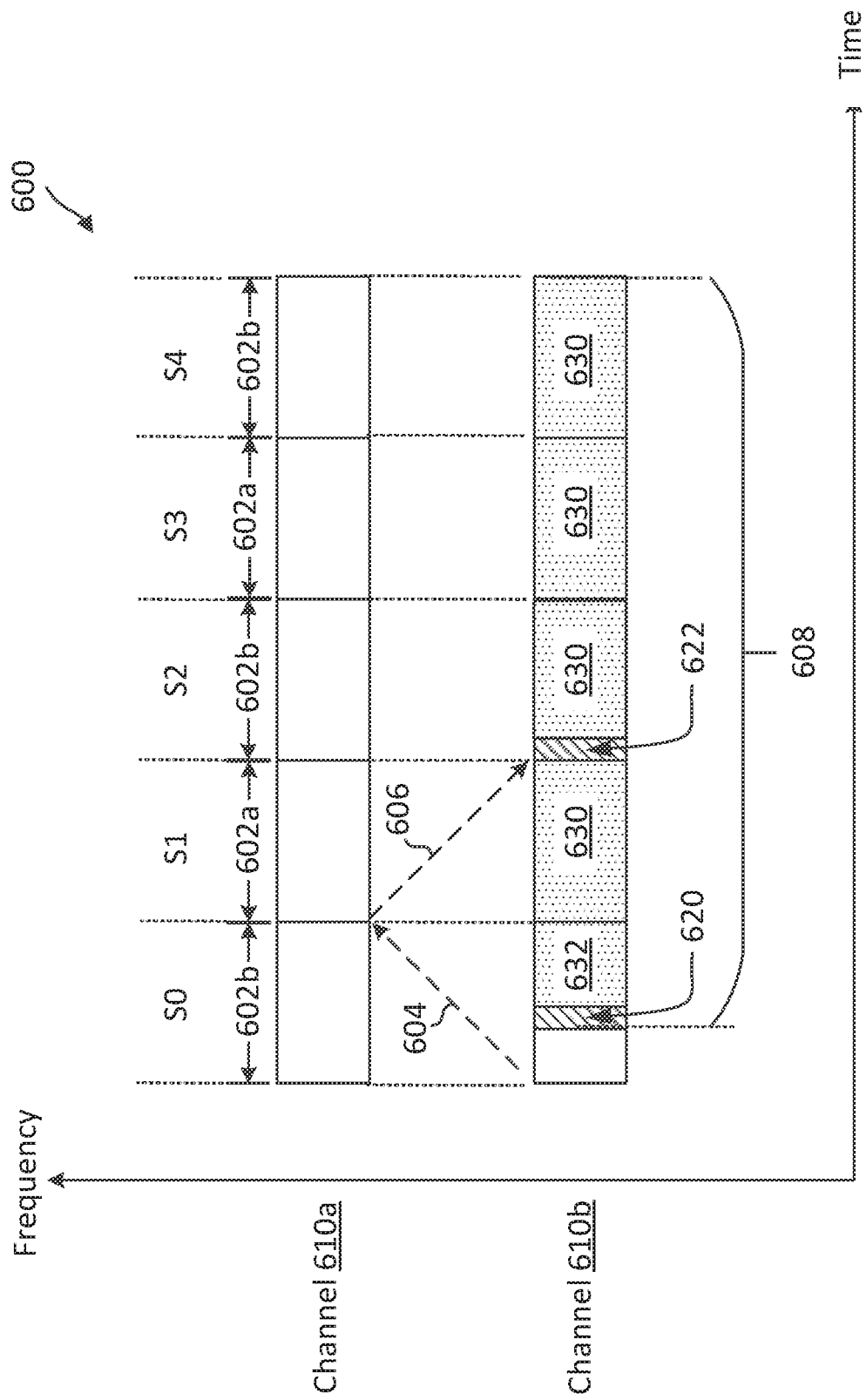
FIG. 6 illustrates a multi-channel listen-before-talk (LBT) configuration and monitoring scheme according to some embodiments of the present disclosure.

FIG. 6 illustrates a multi-channel LBT configuration and monitoring scheme 600 according to some embodiments of the present disclosure. The scheme 600 may be employed by a network such as the network 100. In particular, BSs such as the BSs 105 and 500 may communicate with UEs such as the UEs 115 and 400 in an unlicensed spectrum or a shared spectrum with multi-channels using the scheme 600. The scheme 600 includes two channels 610 shown as 610a and 610b in an unlicensed spectrum or a shared spectrum. Each channel 610 may include any suitable channel bandwidth. In some instances, each channel 610 may include a channel bandwidth of about 20 MHz. The channels 610a and 610b may correspond to the channels 310 in the system bandwidth 302. The channels 610a and 610b may be adjacent channels or non-adjacent channels within a system operational band of the network. The scheme 600 uses a synchronized slot-based structure for communications and channel monitoring.

The scheme 600 time-partitions the channels 610a and 610b into a plurality of slots 602. The slots 602 may be similar to the slots 220 shown in the configuration 200. For example, each slot 602 may correspond to a scheduling unit where a BS may schedule a UE for communication. For simplicity of discussions, FIG. 6 illustrates five slots 602 indexed S0, S1, S2, S3, and S4, though the present disclosure may scale to include any suitable number of slots 602 along a timeline.

Access to the channels 610a and 610b are based on LBT. As an example, a BS may perform an LBT in the channel 610a and an LBT in the channel 610b. The LBT in the channel 610a fails, while the LBT in the channel 610b passes. When the LBT passes in the channel 610b, the BS may transmit a channel occupancy indication signal 620 indicating the start of a TXOP 608 in the channel 610b. The channel occupancy indication signal 620 may function as a reservation signal causing other transmitting nodes to refrain from accessing the channel 610b. In addition, the channel occupancy indication signal 620 may function as an indication to UEs served by the BS that the BS has gained access to the channel 610b so that the UEs may monitor for a communication schedule from the serving BS. After gaining access to the channel 610b, the BS may schedule one or more UEs served by the BS for communications in the channel 610b during the TXOP 608. In some embodiments, the channel occupancy indication signal 620 may also include downlink control information (DCI) indicating a communication schedule for a UE.

As described above, narrowband UEs may have a lower operational bandwidth capability than a wideband UEs, and thus may not be able to monitor the channels 610a and 610b simultaneously. In order for a narrowband UE to determine whether its serving BS has gained access to the channel 610a and/or the channel 610b, the UE may switch channel monitoring between the two channels 610a and 610b. Additionally, the UE may require a certain amount of time for RF tuning (e.g., at the RF unit 414 and/or the transceiver 410) when switching from one channel to another channel 610. In some instances, a narrowband UE may require about 500 µs to decode DCI from a channel occupancy indication signal and switch to a different channel.

Accordingly, in the scheme 600, the serving BS may configure a UE with a pattern for monitoring the channels 610a and 610b and may repeat the transmissions of the channel occupancy indication signal 620 according to the monitoring pattern. In addition, the BS may configure the monitoring pattern such that the channel monitoring periods are spaced apart from each other to allow time for the UE to perform channel switching.

As an example, the BS may configure the UE to monitor the channel 610b in even-numbered or even-indexed slots 602 (shown as 602b) and to monitor the channel 610a in odd-numbered or odd-indexed slots 602 (shown as 602a). To facilitate the UE monitoring, the BS may repeat the transmission of a channel occupancy indication signal 620 at the beginning of a slot 602 (e.g., at a slot boundary) during the TXOP 608 based on the configured monitoring pattern. As shown, the BS repeats the transmission of the channel occupancy indication signal 620 (shown as 622) in a next even-slot boundary (e.g., the slot S2 602b) according to the configured monitoring pattern. As such, the UE may perform channel monitoring in a channel 610 at the beginning of a slot 602. If the UE does not decode any signal from the serving BS indicating an occupancy in the monitoring channel 610 (e.g., the channel 610b), the UE may switch to monitor another channel 610 (e.g., the channel 610a) based on the configured monitoring pattern.

As shown, the UE may monitor the channel 610b at the beginning of the even slot S0 602b (e.g., at a symbol 240 indexed 0 in the slot S0). The UE may not detect or decode any channel occupancy indication signal 620 in the channel 610b as the BS gain access to the channel 610b later in the middle of the slot S0 602b (e.g., at a symbol 240 indexed 4). Thus, the UE switches to monitor the channel 610a in the odd slot S1 602a shown by the dashed arrow 604. The UE may also fail to detect or decode any channel occupancy indication signal 620 in the channel 610a as the BS fails to gain access to the channel 610a. Thus, the UE switches back to monitor the channel 610b in the next even slot S2 602b shown by the dashed arrow 606. Since the BS repeats the transmission of the channel occupancy indication signal 620 (shown as 622) in the slot S2 602b, the UE can detect the channel occupancy indication signal 622 in the slot S2 602b. Thus, the BS may serve the UE in the channel 610b.

In an embodiment, the channel occupancy indication signal 622 may be substantially similar to the initial channel occupancy indication signal 620. For example, the channel occupancy indication signals 620 and 622 can include a preamble (e.g., a predetermined signal sequence), a channel state information-reference signal (CSI-RS), a demodulation reference signal (DMRS), and/or downlink control information (DCI). In some embodiments, the channel occupancy indication signal 620 and 622 can include timing information associated with the TXOP 608. For example, the channel occupancy indication signal 620 may indicate a duration of the TXOP 608 (e.g., from the start of the TXOP 608 till the end of the slot S4 602) and the channel occupancy indication signal 622 may indicate a remaining duration of the TXOP 608 (e.g., from the slot S2 602 till the end of the slot S4 602). In general, the initial channel occupancy indication signal 620 and the subsequent channel occupancy indication signal 622 may be identical or different, but the information in the channel occupancy indication signals 620 and 622 are required to be consistent.

In an embodiment, the BS may configure a CSI-RS configuration, a DMRS configuration, and/or a search space (e.g., a certain group of RBs at the beginning of a slot 602) for a narrowband UE on each channel 610 and the UE may monitor corresponding channels based on the configured monitoring pattern, search space, and the CSI-RS and/or DMRS configurations.

In an embodiment, the BS may schedule a narrowband UE for communication after transmitting the channel occupancy indication signal 622 according to the monitoring pattern. For example, the BS may schedule one or more narrowband UEs for communications 630 in the slots S2, S3, and S4 602.

In some embodiments, the BS may access the medium at a finer granularity for better medium utilization. For example, the BS may schedule one or more narrowband UEs for communications in one or more mini-slots (e.g., the mini-slots 230) within a slot 602.

In some embodiments, the BS may serve narrowband UEs using slot-based access and may serve a UE with a wideband capability using a partial slot-based access. In addition, the BS may allow for an early access, for example, scheduling a wideband UE for a communication 632 in the partial slot S0 602b after gaining access to the TXOP 608.

Figure 7:
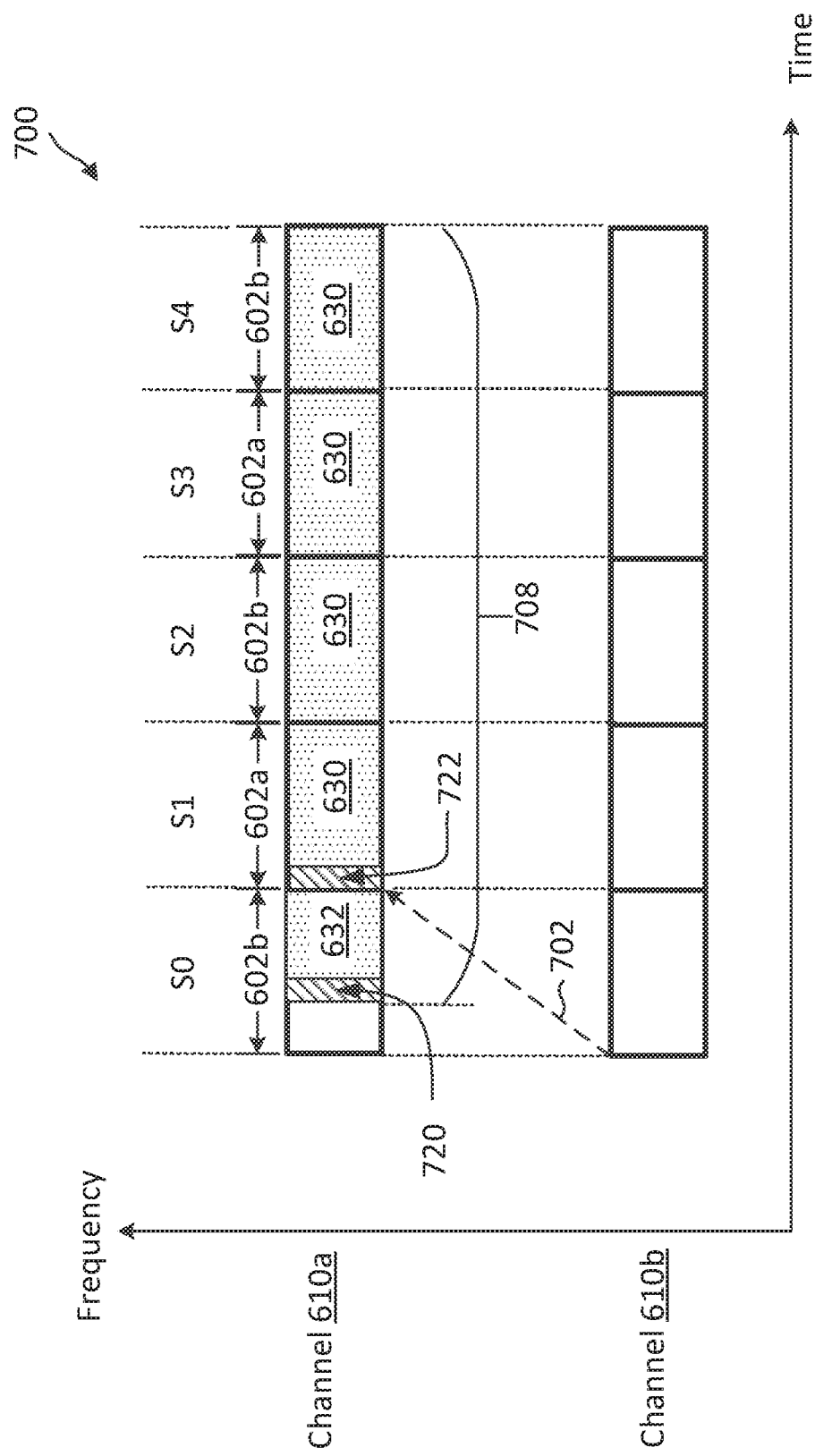
FIG. 7 illustrates a multi-channel LBT configuration and monitoring scheme according to some embodiments of the present disclosure.

FIG. 7 illustrates a multi-channel LBT configuration and monitoring scheme 700 according to some embodiments of the present disclosure. The scheme 700 may be employed by a network such as the network 100. In particular, BSs such as the BSs 105 and 500 may communicate with UEs such as the UEs 115 and 400 in an unlicensed spectrum or a shared spectrum with multi-channels using the scheme 700. The scheme 700 is substantially similar to the scheme 600. The scheme 700 is illustrated using the same channel configuration with a slot-based structure and the same monitoring pattern as in the scheme 600, and may use the same reference numerals as in FIG. 6 for simplicity sake. The scheme 700 illustrates a scenario when a BS gains access to the channel 610a instead of the channel 610b.

Similar to the scheme 600, a BS may configure a narrowband UE to monitor the channel 610b in even slots 602b and to monitor the channel 610a in odd slots 602a. The BS may perform an LBT in the channel 610a and an LBT in the channel 610b. In the scheme 700, the BS gains access to the channel 610a and fails to gain access to the channel 610b. As shown, the BS transmits a channel occupancy indication signal 720 indicating the start of a TXOP 708 in the channel 610a. The BS repeats the transmission of the channel occupancy indication signal 720 (shown as 722) during a next odd slot S1 602a in the TXOP 708 based on the configured monitoring pattern. The initial channel occupancy indication signal 720 and the subsequent channel occupancy indication signal 722 may be substantially similar to the channel occupancy indication signals 620 and 622.

The UE may monitor the channel 610b at the beginning of the even slot S0 602b. The UE may fail to detect or decode any channel occupancy indication signal in the channel 610b as the BS fails to gain access to the channel 610b. Thus, the UE switches to monitor the channel 610a in the odd slot S1 602a shown by the dashed arrow 702. Since the BS repeats the transmission of the channel occupancy indication signal 720 (shown as 722) in the slot S1 602a, the UE can detect the channel occupancy indication signal 722 in the slot S1 602a. Thus, the BS may serve the UE in the channel 610a.

Similar to the scheme 600, the BS may schedule one or more narrowband UEs for communications 630 in the slots S1, S2, S3, and S4 602 and may schedule a wideband UE for a communication 632 in the partial slot S0 602a after gaining access to the TXOP 708.

Figure 8:
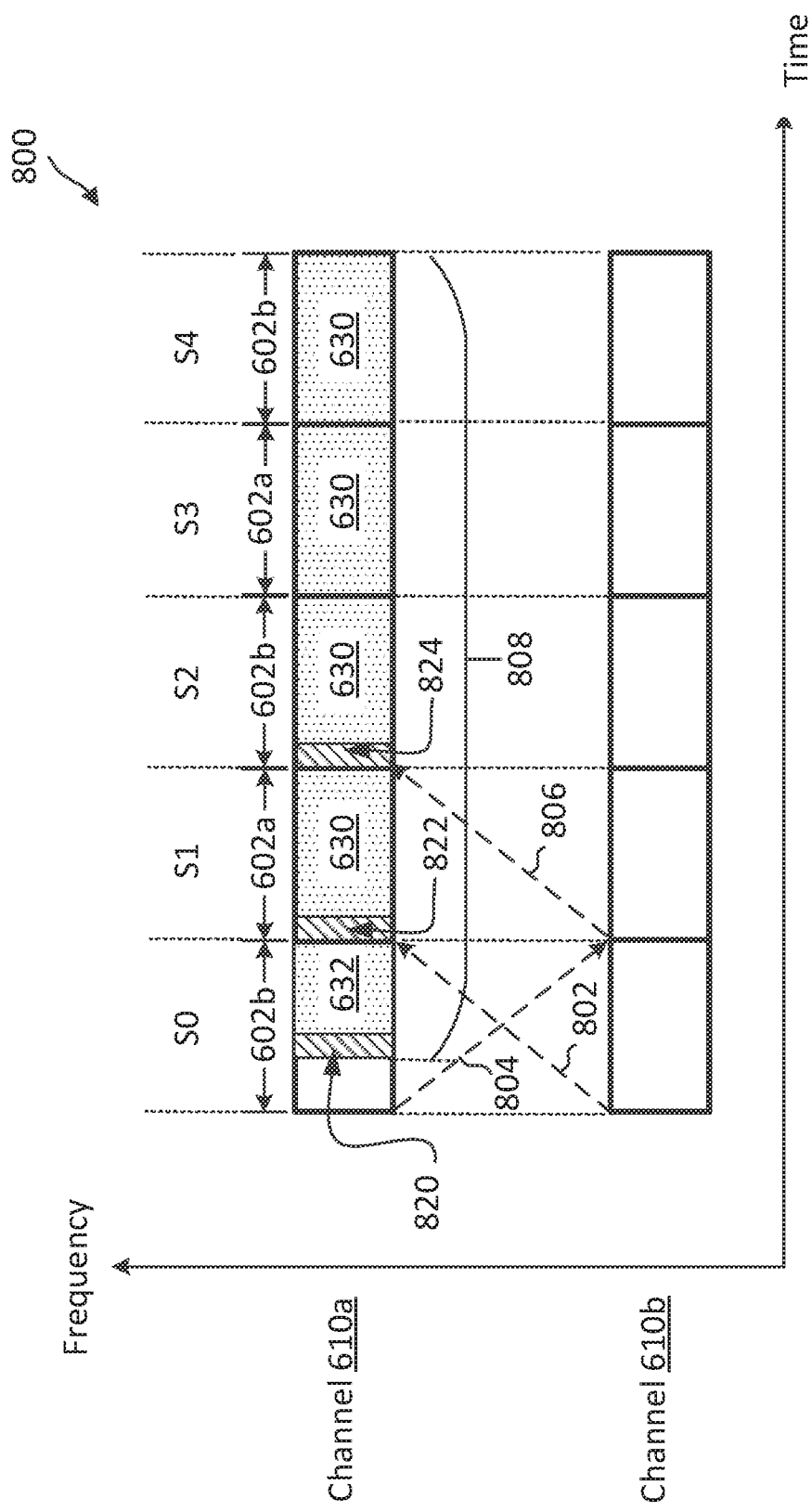
FIG. 8 illustrates a multi-channel LBT configuration and monitoring scheme according to some embodiments of the present disclosure.

FIG. 8 illustrates a multi-channel LBT configuration and monitoring scheme 800 according to some embodiments of the present disclosure. The scheme 800 may be employed by a network such as the network 100. In particular, BSs such as the BSs 105 and 500 may communicate with UEs such as the UEs 115 and 400 in an unlicensed spectrum or a shared spectrum with multi-channels using the scheme 800. The scheme 800 is substantially similar to the schemes 600 and 700. The scheme 800 is illustrated using the same channel configuration with a slot-based structure and the same monitoring pattern as in the schemes 600 and 700, and may use the same reference numerals as in FIG. 6 for simplicity sake. The scheme 800 further illustrates configuring different narrowband UEs with different monitoring patterns.

Similar to the schemes 600 and 700, a BS may configure a first narrowband UE with a first monitoring pattern including even slots 602b for monitoring the channel 610b and in odd slots 602a for monitoring the channel 610a. In addition, the BS may configure a second narrowband UE with a second monitoring pattern including even slots 602b for monitoring the channel 610a and odd slots 602a for monitoring the channel 610b. The BS may repeat the transmission of an initial channel occupancy indication signal for the first UE and the second UE based on the first configured monitoring pattern and the second configured monitoring pattern, respectively.

For example, the BS gains access to the channel 610a, but fails to gain access to the channel 610b. The BS transmits a channel occupancy indication signal 820 indicating the start of a TXOP 808 in the channel 610a. The BS repeats the transmission of the channel occupancy indication signal 820 (shown as 822) during a next odd slot S1 602a in the TXOP 808 for the first UE based on the first configured monitoring pattern. The BS repeats the transmission of the channel occupancy indication signal 820 (shown as 824) again during a next even slot S2 602b in the TXOP 808 for the second UE based on the second configured monitoring pattern. The channel occupancy indication signals 820, 822, and 824 are substantially similar to the channel occupancy indication signals 620, 622, 720, and 722.

The first UE may monitor the channels 610a and 610b based on the first configured monitoring pattern. For example, the first UE may monitor the channel 610b at the beginning of the even slot S0 602b. The first UE may fail to detect or decode any channel occupancy indication signal 720 in the channel 610b as the BS fails to gain access to the channel 610b. Thus, the first UE switches to monitor the channel 610a in the odd slot S1 602a shown by the dashed arrow 802. Since the BS repeats the transmission of the channel occupancy indication signal 820 (shown as 822) in the slot S1 602a, the first UE can detect the channel occupancy indication signal 822 in the slot S1 602a. Thus, the BS may serve the first UE in the channel 610a. For example, the BS may schedule the first UE for a communication 630 in one or more slots S1, S2, S3, and S4 602 of the TXOP 808 after transmitting the channel occupancy indication signal 822.

The second UE may monitor the channels 610a and 610b based on the second configured monitoring pattern. For example, the second UE may monitor the channel 610a at the beginning of the even slot S0 602b. The second UE may fail to detect or decode any channel occupancy indication signal 820 in the channel 610a as the BS transmits the channel occupancy indication signal 820 later in the slot S0 602b. Thus, the second UE switches to monitor the channel 610b in the odd slot S1 602a shown by the dashed arrow 804. The second UE may fail to detect or decode any channel occupancy indication signal in the channel 610b as the BS fails to gain access to the channel 610b. The second UE switches back to monitor the channel 610a in the even slot S2 602b as shown by the arrow 806. Since the BS repeats the transmission of the channel occupancy indication signal 820 (shown as 824) in the slot S2 602b, the second UE can detect the channel occupancy indication signal 824 in the slot S2 602b. Thus, the BS may serve the second UE in the channel 610b. For example, the BS may schedule the second UE for a communication 630 in one or more slots S2, S3, and S4 602 of the TXOP 808 after transmitting the channel occupancy indication signal 824.

Similar to the schemes 600 and 700, the BS may schedule a wideband UE for a communication 632 in the partial slot S0 602a after gaining access to the TXOP 808.

In an embodiment, the BS may assign one group of narrowband UEs with the first monitoring pattern and another group of narrowband UEs with the second monitoring pattern. The assignment of different groups of UEs with different monitoring pattern can allow early access on a given channel for at least one group of UEs.

Figure 9:
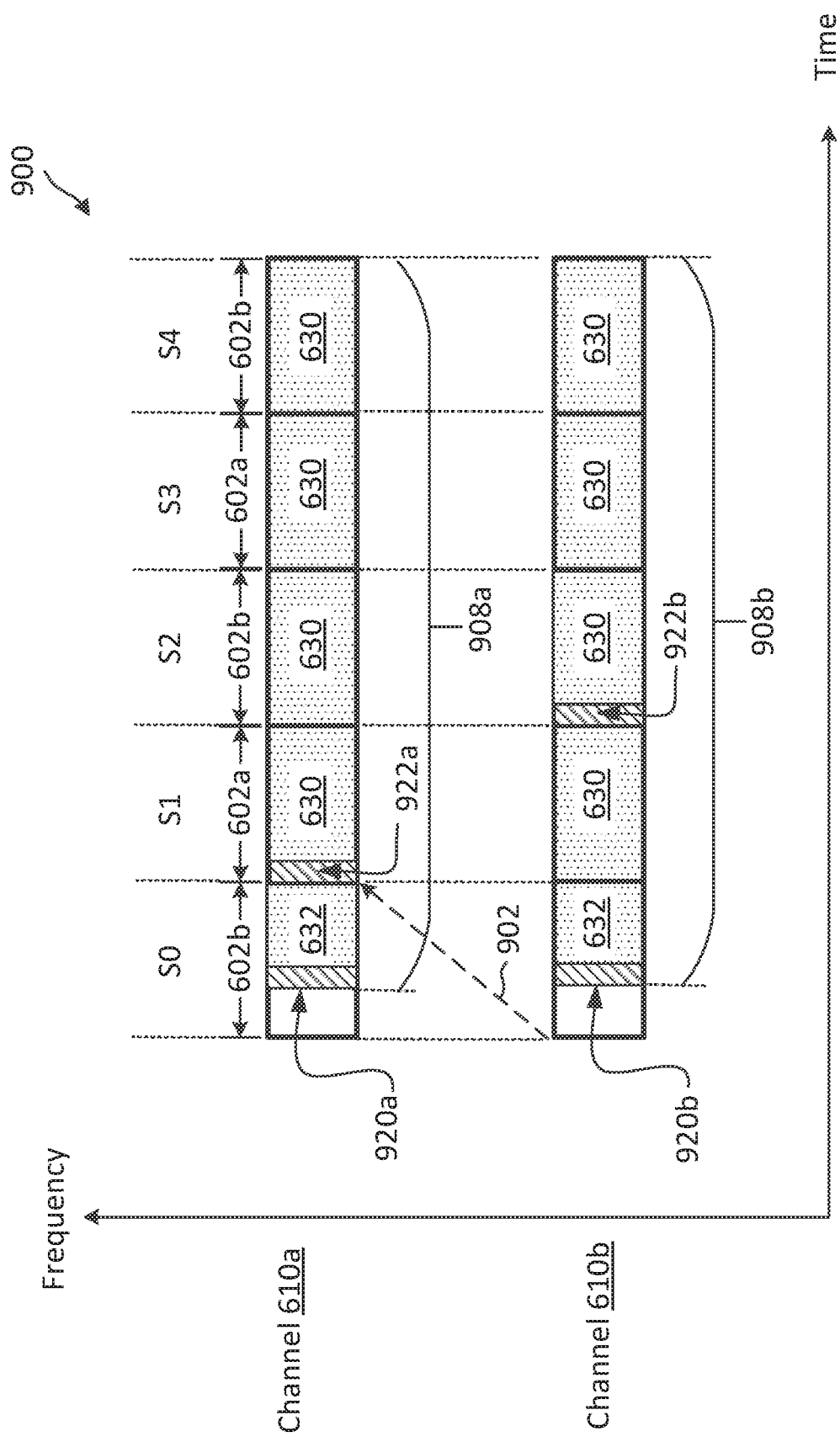
FIG. 9 illustrates a multi-channel LBT configuration and monitoring scheme according to some embodiments of the present disclosure.

FIG. 9 illustrates a multi-channel LBT configuration and monitoring scheme 900 according to some embodiments of the present disclosure. The scheme 900 may be employed by a network such as the network 100. In particular, BSs such as the BSs 105 and 500 may communicate with UEs such as the UEs 115 and 400 in an unlicensed spectrum or a shared spectrum with multi-channels using the scheme 900. The scheme 900 is substantially similar to the schemes 600, 700, and 800. The scheme 900 is illustrated using the same channel configuration with a slot-based structure and the same monitoring pattern as in the schemes 600, 700, and 800, and may use the same reference numerals as in FIG. 6 for simplicity sake. The scheme 900 illustrates a scenario where a BS may gain access to both channels 610a and 610b.

Similar to the schemes 600 and 700, a BS may configure a narrowband UE with a channel monitoring pattern including even slots 602b for monitoring the channel 610b and odd slots 602a for monitoring the channel 610a. The BS may perform an LBT in the channels 610a and 610b separately or together. When the BS passes LBT in both channels 610a and 610b, the BS may repeat the transmission of an initial channel occupancy indication signal for the UE in both the channel 610a and the channel 610b according to the configured monitoring pattern.

As shown, the BS transmits a channel occupancy indication signal 920a in the channel 610a after gaining a TXOP 908a in the channel 610a. The BS repeats the transmission of the channel occupancy indication signal 920a (shown as 922a) in the channel 610a during a next odd slot S1 602a in the TXOP 908 based on the configured monitoring pattern. Similarly, the BS transmits a channel occupancy indication signal 920b in the channel 610b after gaining a TXOP 908b in the channel 610b. The BS repeats the transmission of the channel occupancy indication signal 920b (shown as 922b) in the channel 610b during a next even slot S2 6020 in the TXOP 908b based on the configured monitoring pattern. The channel occupancy indication signals 920a, 922a, 920b, and 922b are substantially similar to the channel occupancy indication signals 620, 622, 720, 722, 820, 822, and 824.

The UE may monitor the channel 610b at the beginning of the even slot S0 602b. The UE may fail to detect or decode any channel occupancy indication signal in the channel 610b as the BS transmits the channel occupancy indication signal 920b later in the slot S0 602b. Thus, the UE switches to monitor the channel 610a in the odd slot S1 602a shown by the dashed arrow 902. Since the BS repeats the transmission of the channel occupancy indication signal 920a (shown as 922a) in the slot S1 602a, the UE can detect the channel occupancy indication signal 922a in the slot S1 602a. After detecting the channel occupancy indication signal 922a in the channel 610a, the UE may stay on the channel 610a.

When the BS gains access to multiple channels 610 (e.g., the channels 610a and 610b), the BS may not be aware whether a UE is on the channel 610a or the channel 610 since a UE may miss the detection of the channel occupancy indication signal 922a and switch to monitor the channel 610b during the even slot S2 602b. Thus, the UE may detect the channel occupancy indication signal 922b in the channel 610b and stay on the channel 610b instead. Accordingly, in the scheme 900, the UE may report the detection of a channel occupancy indication signal back to indicate the channel that the UE is on. The BS may monitor for a detection report from a UE in all active channels 610 (e.g., the channels 610a and 610b) that the BS has gained access to in order to determine which channel to serve the UE on.

For example, when the UE detected the channel occupancy indication signal 922a in the channel 610a, the UE may transmit a detection report to the BS in the channel 610a. Upon receiving the detection report in the channel 610a, the BS may serve the UE on the channel 610a in one or more slots S1, S2, S3, and S4 602 of the TXOP 908a. Conversely, when the UE detected the channel occupancy indication signal 922b in the channel 610b, the UE may transmit a detection report to the BS in the channel 610b. Upon receiving the detection report in the channel 610b, the BS may serve the UE on the channel 610b in one or more slots S2, S3, and S4 602 of the TXOP 908b. In addition, the BS may schedule a wideband UE for a communication 632 during the partial slot S0 602b in the channel 610a after gaining access to the TXOP 908a and/or during the partial slot S0 602b in the channel 610b after gaining access to the TXOP 908b.

In some embodiments, after the BS receives a detection report from a UE, the BS can switch the UE to a different channel 610. For example, the UE may transmit a detection report indicating that the UE is on the channel 610a. In response, the BS may send an instruction to switch the UE to the channel 610b, for example, based on traffic loads, channel conditions, and/or other scheduling decisions.

Figure 10:
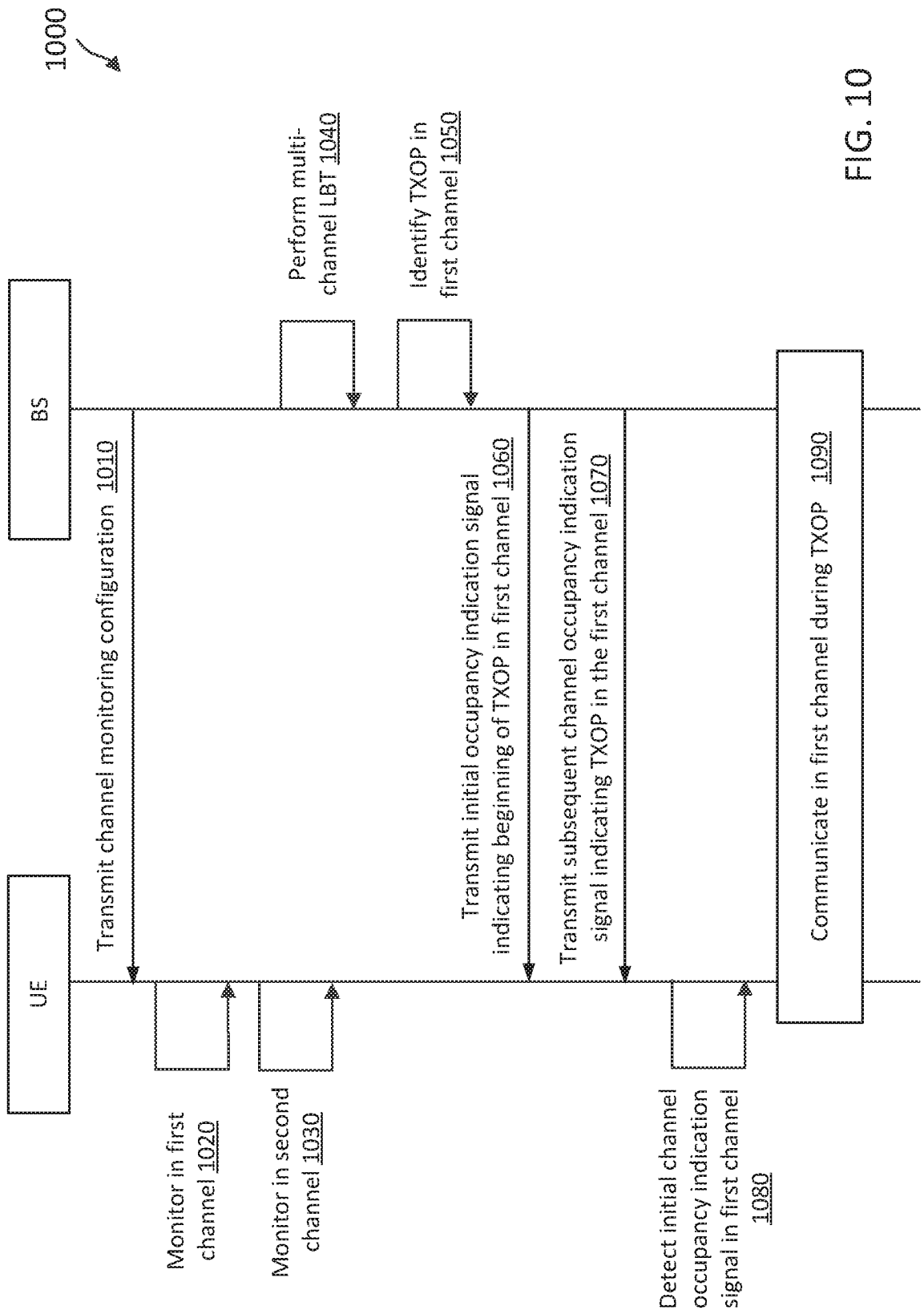
FIG. 10 is a signaling diagram illustrating a multi-channel LBT configuration and monitoring method according to some embodiments of the present disclosure.

FIG. 10 is a signaling diagram illustrating a multi-channel LBT configuration and monitoring method 1000 according to some embodiments of the present disclosure. The method 1000 is implemented by a BS (e.g., the BSs 105 and 500) and a UE (e.g., the UEs 115 and 400) in a network (e.g., the network 100) operating over a medium (e.g., the frequency spectrum 1004) shared by multiple network operating entities. The method 1000 may employ similar mechanisms as in the configurations 200 and 300 and the schemes 600, 700, 800, and 900 described with respect to FIGS. 2, 3, 6, 7, 8, and 9, respectively. Steps of the method 1000 can be executed by computing devices (e.g., a processor, processing circuit, and/or other suitable component) of the BS and the UE. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the BS transmits a channel monitoring configuration. The channel monitoring configuration may indicate a first set of channel monitoring occasions (e.g., the odd slots 602a) for a first channel (e.g., the channel 610a) and a second set of channel monitoring occasions (e.g., the even slots 602b) for a second channel (e.g., the channel 610b). The first set of channel monitoring occasions and the second set of channel monitoring occasions may interleave in time.

At step 1020, the UE monitors the first channel based on the configuration during the first set of channel monitoring occasions.

At step 1030, the UE monitors the second channel based on the configuration during the second set of channel monitoring occasions. The monitoring of the first channel in the step 1020 and the monitoring of the second channel in the step 1030 may switch back and forth. In other words, the UE may switch between the first channel and the second channel for the monitoring based on the configured channel monitoring occasions in the first channel and the second channel.

At step 1040, the BS performs an LBT in the first channel and an LBT in the second channel.

At step 1050, the BS identifies a TXOP (e.g., the TXOPs 608, 708, 808, 908a, and 908b) in the first channel.

At step 1060, after identifying the TXOP in the first channel, the BS transmits an initial channel occupancy indication signal (e.g., the channel occupancy indication signals 620, 720, 820, 920a, and 920b) in the first channel indicating the beginning of the TXOP.

At step 1070, the BS transmits a subsequent channel occupancy indication signal (e.g., the channel occupancy indication signals 622, 722, 822, 824, 922a, and 922b) repeating the indication of the TXOP in the first channel during a channel monitoring occasion of the first set of channel monitoring occasion.

At step 1080, based on the monitoring in the step 1020, the UE detects the initial channel occupancy indication signal in the first channel.

At step 1090, the BS may serve the UE and communicate with the UE (e.g., the communications 630) in the first channel during the TXOP.

Figure 11:
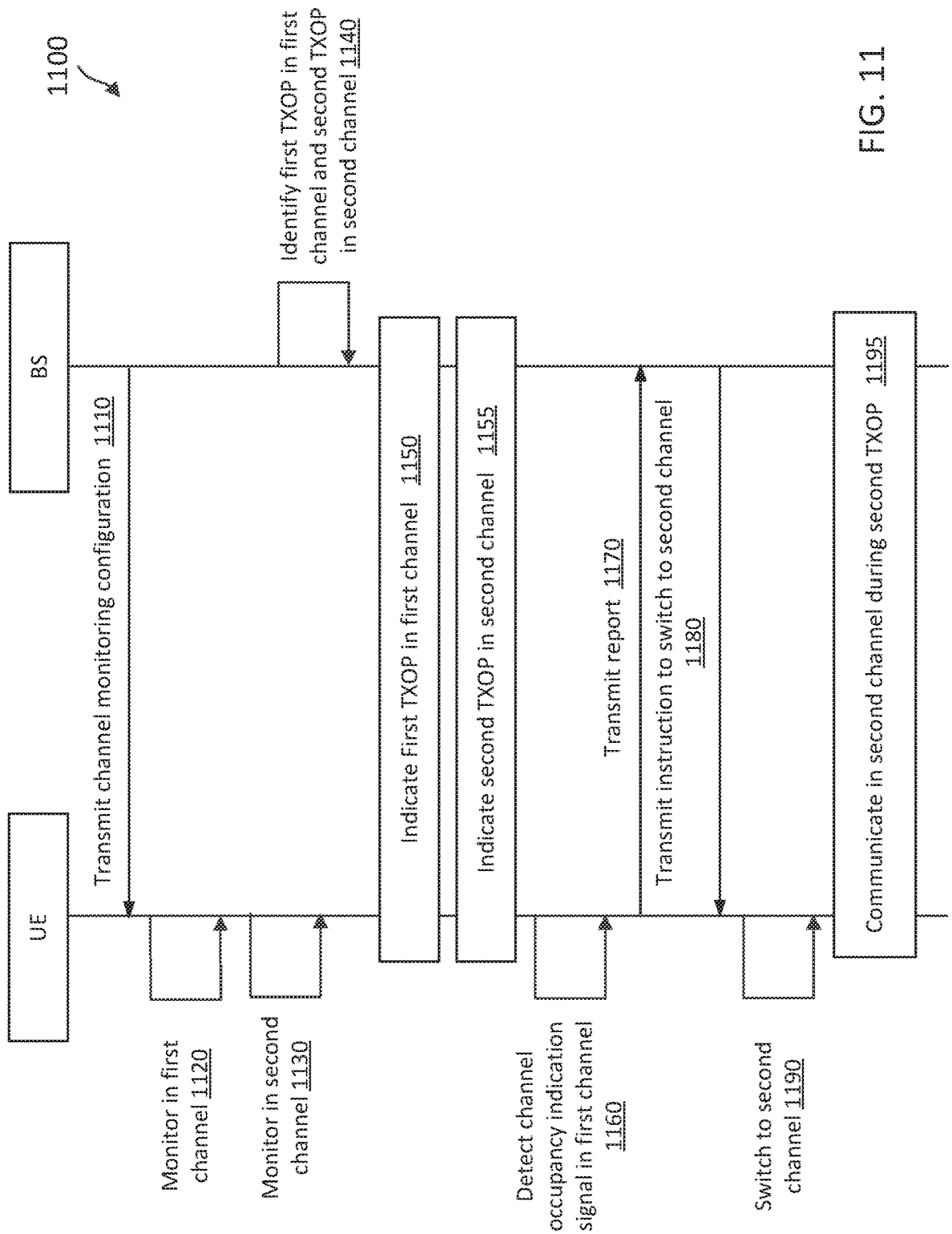
FIG. 11 is a signaling diagram illustrating a multi-channel LBT configuration and monitoring method according to some embodiments of the present disclosure.

FIG. 11 is a signaling diagram illustrating a multi-channel LBT configuration and monitoring method 1100 according to some embodiments of the present disclosure. The method 1100 is implemented by a BS (e.g., the BSs 105 and 500) and a UE (e.g., the UEs 115 and 400) in a network (e.g., the network 100) operating over a medium (e.g., the frequency spectrum 1004) shared by multiple network operating entities. The method 1100 may employ similar mechanisms as in the configurations 200 and 300, the schemes 600, 700, 800, and 900, and the method 1000 described with respect to FIGS. 2, 3, 6, 7, 8, 9, and 10, respectively. Steps of the method 1100 can be executed by computing devices (e.g., a processor, processing circuit, and/or other suitable component) of the BS and the UE. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the BS transmits a channel monitoring configuration. The channel monitoring configuration may indicate a first set of channel monitoring occasions (e.g., the odd slots 602a) for a first channel (e.g., the channel 610a) and a second set of channel monitoring occasions (e.g., the even slots 602b) for a second channel (e.g., the channel 610b). The first set of channel monitoring occasions and the second set of channel monitoring occasions may interleave in time.

At step 1120, the UE monitors the first channel based on the configuration during the first set of channel monitoring occasions.

At step 1130, the UE monitors the second channel based on the configuration during the second set of channel monitoring occasions. The UE may switch between the first channel and the second channel for the monitoring based on the configured channel monitoring occasions in the first channel and the second channel.

At step 1140, the BS identifies a first TXOP (e.g., the TXOP 908a) in the first channel and a second TXOP (e.g., the TXOP 908b) in the second channel at the same time, for example, as shown in the scheme 900.

At step 1150, the BS indicates the first TXOP in the first channel. For example, the BS transmits an initial channel occupancy indication signal (e.g., the channel occupancy indication signals 620, 720, 820, 920a, and 920b) in the first channel indicating the beginning of the first TXOP. Subsequently, the BS repeats the channel occupancy indication by transmitting a subsequent channel occupancy indication signal (e.g., the channel occupancy indication signals 622, 722, 822, 824, 922a, and 922b) in the first channel according to the configuration.

At step 1155, the BS indicates the second TXOP in the second channel using similar mechanisms as the indication of the first TXOP.

At step 1160, the based on the monitoring in the step 1120, the UE detects the initial channel occupancy indication signal in the first channel.

At step 1170, the UE transmits a detection report to the BS indicating that the UE is on the first channel.

At step 1180, after receiving the detection report, the BS transmits an instruction to switch the UE to the second channel.

At step 1190, upon receiving the instruction, the UE switches to the second channel, for example, by reconfiguring the RF frontend to tune to the second channel.

At step 1195, the BS communicates with the UE (e.g., the communications 630) in the second channel during the second TXOP.

Figure 12:
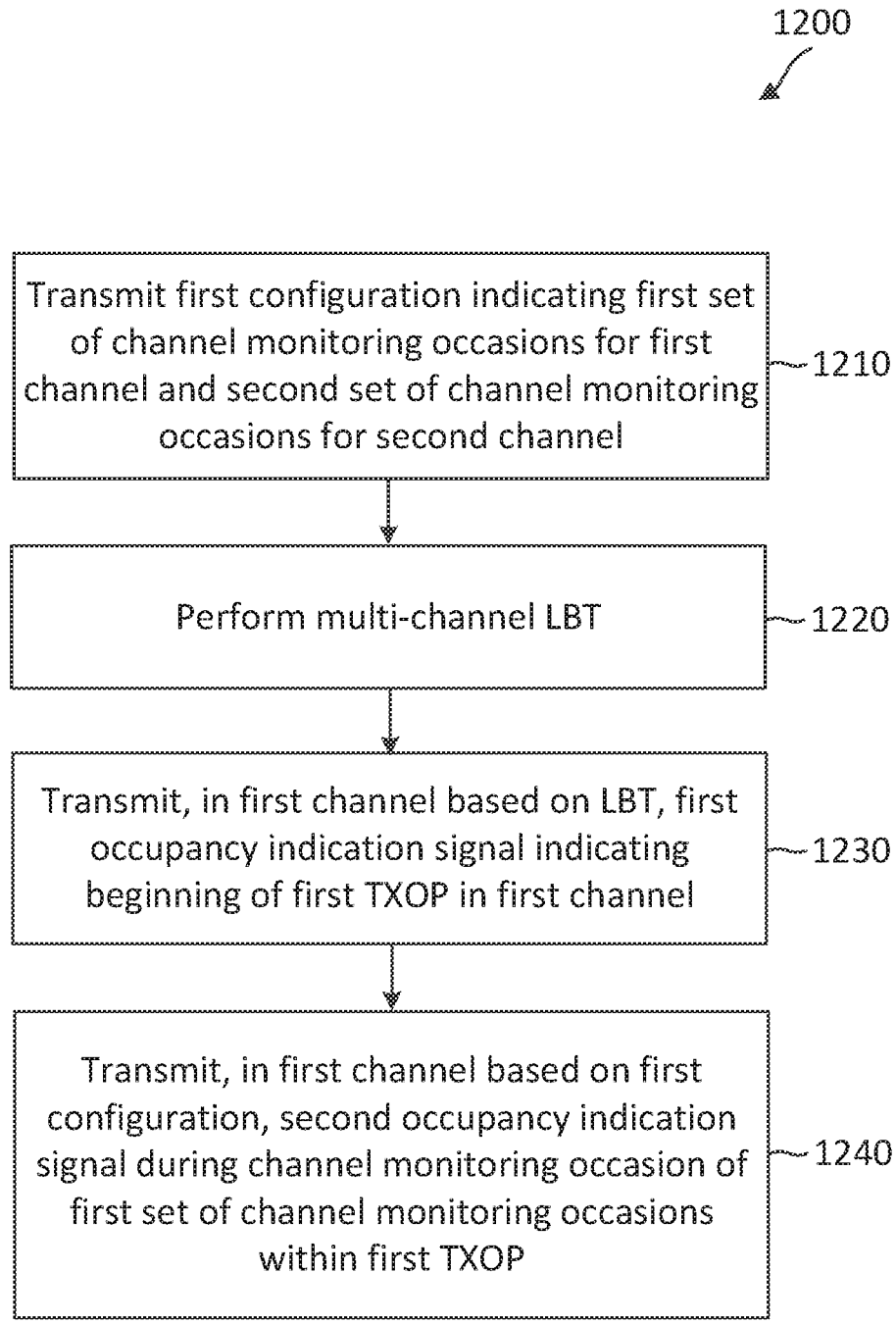
FIG. 12 is a flow diagram of a multi-channel communication method according to some embodiments of the present disclosure.

FIG. 12 is a flow diagram of a multi-channel communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the channel configuration module 508, the communication module 509, the transceiver 510, and the one or more antennas 516, to execute the steps of method 1200. The method 1200 may employ similar mechanisms as in the configurations 200 and 300, the schemes 600, 700, 800, and 900, the methods 1000 and 1100 described with respect to FIGS. 2, 3, 6, 7, 8, 9, 10, and 11, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes transmitting, by a first wireless communication device (e.g., the BSs 105 and 500), a first configuration indicating a first set of channel monitoring occasions (e.g., in the odd slots 602a) for a first channel (e.g., the channel 610a) and a second set of channel monitoring occasions (e.g., in the even slots 602b) for a second channel (e.g., the channel 610b).

At step 1220, the method 1200 includes performing, by the first wireless communication device, a multi-channel LBT in the first channel and the second channel. For example, the first wireless communication device may perform an LBT in the first channel and an LBT in the second channel.

At step 1230, the method 1200 includes transmitting, by the first wireless communication device in the first channel based on at least the LBT in the first channel, a first occupancy indication signal (e.g., the channel occupancy indication signals 620, 720, 820, 920a, and 920b) indicating a beginning of a first TXOP (e.g., the TXOPs 608, 708, 808, 908a, 908b) in the first channel.

At step 1240, the method 1200 includes transmitting, by the first wireless communication device in the first channel based on the first configuration, a second occupancy indication signal (e.g., the channel occupancy indication signals 622, 722, 822, 824, 922a, and 922b) associated with the first TXOP in the first channel during a channel monitoring occasion of the first set of channel monitoring occasions within the first TXOP.

In an embodiment, the first occupancy indication signal is transmitted at the beginning of the first TXOP outside of the first set of channel monitoring occasions.

In an embodiment, the first wireless communication device further communicates, with a second wireless communication device (e.g., the UEs 115 and 400 with a narrowband capability) in the first channel, a first communication signal (e.g., the communications 630) during the first TXOP after transmitting the second occupancy indication signal.

In an embodiment, the first wireless communication device further communicates, with a third wireless communication device (e.g., the UEs 115 and 400 with a wideband capability) different from the second wireless communication device in the first channel, a second communication signal (e.g., the communications 632) during the first TXOP before transmitting the second occupancy indication signal.

In an embodiment, the first wireless communication device further transmits in the second channel based on at least an LBT in the second channel, a third occupancy indication signal (e.g., the channel occupancy indication signals 620, 720, 820, 920*a*, and 920*b*) indicating a beginning of a second TXOP in the second channel. The first wireless communication device further transmits in the second channel based on the first configuration, a fourth occupancy indication signal (e.g., the channel occupancy indication signals 622, 722, 822, 824, 922*a*, and 922*b*) during a channel monitoring occasion of the second set of channel monitoring occasions within the second TXOP.

In an embodiment, the first wireless communication device further receives, from a second wireless communication device (e.g., the UEs 115 and 400) in the second channel, a report indicating a detection of the second TXOP based on at least one of the third occupancy indication signal or the fourth occupancy indication signal. In an embodiment, the first wireless communication device further transmits, to the second wireless communication device, an instruction to switch to the first channel. The first wireless communication device further communicates, with the second wireless communication device, a communication signal (e.g., the communications 630) in the first channel based on the instruction.

In an embodiment, at least one of the first occupancy indication signal or the second occupancy indication signal includes at least one of a preamble signal, a DMRS, DCI, or timing information (e.g., a duration of the first TXOP or a remaining duration of the first TXOP) associated with the first TXOP.

In an embodiment, the first wireless communication device further transmits a timer configuration for switching channel monitoring from the first channel to the second channel. The timer configuration can be carried by a radio resource configuration (RRC) message.

In an embodiment, the first wireless communication device further transmits a second configuration indicating a third set of channel monitoring occasions in the first channel different from the first set of channel monitoring occasions, where the second configuration and the first configuration are designated for different wireless communication devices. The first wireless communication device further transmits, in the first channel based on the second configuration, a third occupancy indication signal during a channel monitoring occasion of the third set of channel monitoring occasions within the first TXOP. For example, the second occupancy indication signal may correspond to the channel occupancy indication signal 822 and the third occupancy indication signal may correspond to the channel occupancy indication signal 824 as shown in the scheme 800.

Figure 13:
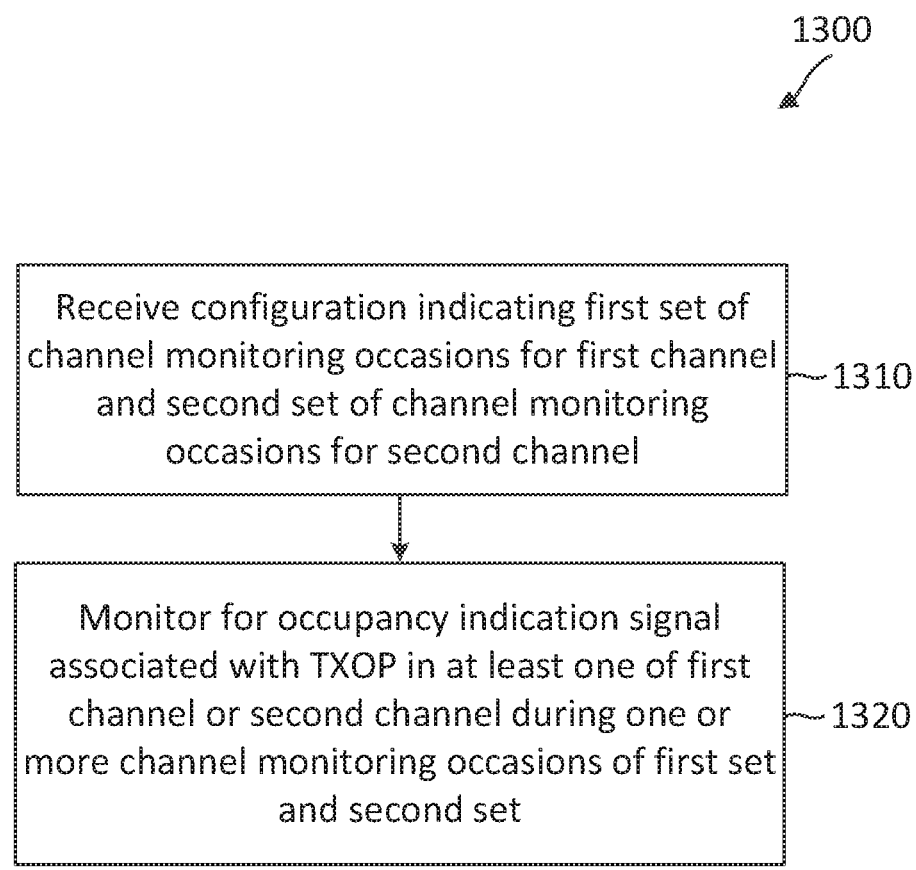
FIG. 13 is a flow diagram of a multi-channel communication method according to some embodiments of the present disclosure.

FIG. 13 is a flow diagram of a multi-channel communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the channel monitoring module 408, the communication module 409, the transceiver 410, and the one or more antennas 416, to execute the steps of method 1300. The method 1300 may employ similar mechanisms as in the configurations 200 and 300, the schemes 600, 700, 800, and 900, the methods 1000 and 1100 described with respect to FIGS. 2, 3, 6, 7, 8, 9, 10, and 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, by a first wireless communication device (e.g., the UEs 115 and 400) from a second wireless communication device (e.g., the BSs 105 and 500), a configuration indicating a first set of channel monitoring occasions (e.g., in the odd slots 602*a*) for a first channel (e.g., the channel 610*a*) and a second set of channel monitoring occasions (e.g., in the even slots 602*b*) for a second channel (e.g., the channel 610*b*).

At step 1320, the method 1300 includes monitoring, by the first wireless communication device, for an occupancy indication signal (e.g., the channel occupancy indication signals 620, 622, 720, 722, 820, 822, 824, 820, 922*a*, and 922*b*) associated with a TXOP (e.g., the TXOPs 608, 708, 808, 908*a*, 908*b*) in at least one of the first channel or the second channel during one or more channel monitoring occasions of the first set of channel monitoring occasions and the second set of channel monitoring occasions based on the configuration.

In an embodiment, the monitoring includes monitoring, by the first wireless communication device, for a first occupancy indication signal associated with a first TXOP in the first channel during a channel monitoring occasion of the first set of channel monitoring occasions. The monitoring further includes switching, by the first wireless communication device, to monitor for a second occupancy indication signal associated with a second TXOP in the second channel during a channel monitoring occasion of the second set of channel monitoring occasions when there is no first occupancy indication signal detected in the first channel during the channel monitoring occasion.

In an embodiment, the first wireless communication device further detects a first occupancy indication signal associated with a first TXOP in the first channel based on the monitoring. The first wireless communication device further communicates, with the second wireless communication device in the first channel, a communication signal (e.g., the communications 630) during the first TXOP after the detecting.

In an embodiment, the first occupancy indication signal includes at least one of a preamble signal, a DMRS, DCI, or information (e.g., the duration of the first TXOP or a remaining duration of the TXOP) associated with the first TXOP.

In an embodiment, the first occupancy indication signal includes the timing information associated with the first TXOP. In such an embodiment, the first wireless communication device further switches, after the detecting, to monitor the second channel for a second occupancy indication signal associated with a second TXOP in the second channel based on the timing information.

In an embodiment, the first wireless communication device further receives a channel switching timer configuration (e.g., in an RRC message). The first wireless communication device further switches, after the detecting, to monitor the second channel for a second occupancy indication signal associated with a second TXOP based on the channel switching timer configuration.

In an embodiment, the first wireless communication device further transmits, to the second wireless communication device in the first channel based on the detecting, a report indicating the detection.

In an embodiment, a BS (e.g., the BSs 105 and 500) may communicate with a UE (e.g., the UEs 115 and 400) using any suitable combination of the configurations 200 and 300, the schemes 600, 700, 800, and 900, and the methods 1000, 1100, 1200, and 1300 described above with respect to FIGS. 2, 3, 6, 7, 8, 9, 10, 11, 12, and 13, respectively. In addition, while the present disclosure describes the synchronization mechanisms between UEs and BSs using examples including two channels (e.g., the channels 610a and 610b), the disclosed embodiments can be extended to include multi-channel LBT scenarios including any suitable number of channels (e.g., 3, 4 or more).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising transmitting, by a first wireless communication device, a first configuration indicating a first set of channel monitoring occasions for a first channel and a second set of channel monitoring occasions for a second channel; transmitting, by the first wireless communication device in the first channel based on at least a listen-before-talk (LBT) in the first channel, a first occupancy indication signal indicating a beginning of a first transmission opportunity (TXOP) in the first channel; and transmitting, by the first wireless communication device in the first channel based on the first configuration, a second occupancy indication signal associated with the first TXOP in the first channel during a channel monitoring occasion of the first set of channel monitoring occasions within the first TXOP.

In some embodiments, wherein the first set of channel monitoring occasions interleaves with the second set of channel monitoring occasions in time. In some embodiments, wherein the transmitting the first occupancy indication signal includes transmitting, by the first wireless communication device, the first occupancy indication signal at the beginning of the first TXOP outside of the first set of channel monitoring occasions. In some embodiments, the method further comprises communicating, by the first wireless communication device with a second wireless communication device in the first channel, a first communication signal during the first TXOP after transmitting the second occupancy indication signal. In some embodiments, the method further comprises communicating, by the first wireless communication device with a third wireless communication device different from the second wireless communication device in the first channel, a second communication signal during the first TXOP before transmitting the second occupancy indication signal. In some embodiments, the method further comprises transmitting, by the first wireless communication device in the second channel based on at least an LBT in the second channel, a third occupancy indication signal indicating a beginning of a second TXOP in the second channel; and transmitting, by the first wireless communication device in the second channel based on the first configuration, a fourth occupancy indication signal during a channel monitoring occasion of the second set of channel monitoring occasions within the second TXOP. In some embodiments, the method further comprises receiving, by the first wireless communication device from a second wireless communication device in the second channel, a report indicating a detection of the second TXOP based on at least one of the third occupancy indication signal or the fourth occupancy indication signal. In some embodiments, the method further comprises transmitting, by the first wireless communication device to the second wireless communication device, an instruction to switch to the first channel; and communicating, by the first wireless communication device with the second wireless communication device, a communication signal in the first channel based on the instruction. In some embodiments, wherein at least one of the first occupancy indication signal or the second occupancy indication signal includes at least one of a preamble signal, a demodulation reference signal (DMRS), downlink control information (DCI), or timing information associated with the first TXOP. In some embodiments, the method further comprises transmitting, by the first wireless communication device, a timer configuration for switching channel monitoring from the first channel to the second channel. In some embodiments, the method further comprises transmitting, by the first wireless communication device, a second configuration indicating a third set of channel monitoring occasions in the first channel different from the first set of channel monitoring occasions, the second configuration and the first configuration designated for different wireless communication devices; and transmitting, by the first wireless communication device in the first channel based on the second configuration, a third occupancy indication signal during a channel monitoring occasion of the third set of channel monitoring occasions within the first TXOP.

Further embodiments of the present disclosure include a method of wireless communication, comprising receiving, by a first wireless communication device from a second wireless communication device, a configuration indicating a first set of channel monitoring occasions for a first channel and a second set of channel monitoring occasions for a second channel; and monitoring, by the first wireless communication device, for a occupancy indication signal associated with a transmission opportunity (TXOP) in at least one of the first channel or the second channel during one or more channel monitoring occasions of the first set of channel monitoring occasions and the second set of channel monitoring occasions based on the configuration.

In some embodiments, wherein the first set of channel monitoring occasions interleaves with the second set of channel monitoring occasions in time. In some embodiments, wherein the monitoring includes monitoring, by the first wireless communication device, for a first occupancy indication signal associated with a first TXOP in the first channel during a channel monitoring occasion of the first set of channel monitoring occasions; and switching, by the first wireless communication device, to monitor for a second occupancy indication signal associated with a second TXOP in the second channel during a channel monitoring occasion of the second set of channel monitoring occasions when there is no first occupancy indication signal detected in the first channel during the channel monitoring occasion. In some embodiments, the method further comprises detecting, by the first wireless communication device, a first occupancy indication signal associated with a first TXOP in the first channel based on the monitoring. In some embodiments, the method further comprises communicating, by the first wireless communication device with the second wireless communication device in the first channel, a communication signal during the first TXOP after the detecting. In some embodiments, wherein the first occupancy indication signal includes at least one of a preamble signal, a demodulation reference signal (DMRS), downlink control information (DCI), or timing information associated with the first TXOP. In some embodiments, wherein the first occupancy indication signal includes the timing information associated with the first TXOP, and wherein the method further comprises switching, by the first wireless communication device after the detecting, to monitor the second channel for a second occupancy indication signal associated with a second TXOP in the second channel based on the timing information. In some embodiments, the method further comprises receiving, by the first wireless communication device, a channel switching timer configuration; and switching, by the first wireless communication device after the detecting, to monitor the second channel for a second occupancy indication signal associated with a second TXOP based on the channel switching timer configuration. In some embodiments, the method further comprises transmitting, by the first wireless communication device to the second wireless communication device in the first channel based on the detecting, a report indicating the detection. In some embodiments, the method further comprises receiving, by the first wireless communication device from the second wireless communication device, an instruction to switch to the second channel; and communicating, by the first wireless communication device with the second wireless communication device in the second channel, a communication signal based on the received instruction.

Further embodiments of the present disclosure include an apparatus comprising a transceiver configured to transmit a first configuration indicating a first set of channel monitoring occasions for a first channel and a second set of channel monitoring occasions for a second channel; transmit, in the first channel based on at least a listen-before-talk (LBT) in the first channel, a first occupancy indication signal indicating a beginning of a first transmission opportunity (TXOP) in the first channel; and transmit, in the first channel based on the first configuration, a second occupancy indication signal associated with the first TXOP in the first channel during a channel monitoring occasion of the first set of channel monitoring occasions within the first TXOP.

In some embodiments, wherein the first set of channel monitoring occasions interleaves with the second set of channel monitoring occasions in time. In some embodiments, wherein the transceiver is further configured to transmit the first occupancy indication signal at the beginning of the first TXOP outside of the first set of channel monitoring occasions. In some embodiments, wherein the transceiver is further configured to communicate, with a first wireless communication device in the first channel, a first communication signal during the first TXOP after transmitting the second occupancy indication signal. In some embodiments, wherein the transceiver is further configured to communicate, with a third wireless communication device different from the first wireless communication device in the first channel, a second communication signal during the first TXOP before transmitting the second occupancy indication signal. In some embodiments, wherein the transceiver is further configured to transmit, in the second channel based on at least an LBT in the second channel, a third occupancy indication signal indicating a beginning of a second TXOP in the second channel; and transmit, in the second channel based on the first configuration, a fourth occupancy indication signal during a channel monitoring occasion of the second set of channel monitoring occasions within the second TXOP. In some embodiments, wherein the transceiver is further configured to receive, from a first wireless communication device in the second channel, a report indicating a detection of the second TXOP based on at least one of the third occupancy indication signal or the fourth occupancy indication signal. In some embodiments, wherein the transceiver is further configured to transmit, to the first wireless communication device, an instruction to switch to the first channel; and communicate, with the first wireless communication device, a communication signal in the first channel based on the instruction. In some embodiments, wherein at least one of the first occupancy indication signal or the second occupancy indication signal includes at least one of a preamble signal, a demodulation reference signal (DMRS), downlink control information (DCI), or timing information associated with the first TXOP. In some embodiments, wherein the transceiver is further configured to transmit a timer configuration for switching channel monitoring from the first channel to the second channel. In some embodiments, wherein the transceiver is further configured to transmit a second configuration indicating a third set of channel monitoring occasions in the first channel different from the first set of channel monitoring occasions, the second configuration and the first configuration designated for different wireless communication devices; and transmit, in the first channel based on the second configuration, a third occupancy indication signal during a channel monitoring occasion of the third set of channel monitoring occasions within the first TXOP.

Further embodiments of the present disclosure include an apparatus comprising a transceiver configured to receive, from a first wireless communication device, a configuration indicating a first set of channel monitoring occasions for a first channel and a second set of channel monitoring occasions for a second channel; and a processor configured to monitor for an occupancy indication signal associated with a transmission opportunity (TXOP) in at least one of the first channel or the second channel during one or more channel monitoring occasions of the first set of channel monitoring occasions and the second set of channel monitoring occasions based on the configuration.

In some embodiments, wherein the first set of channel monitoring occasions interleaves with the second set of channel monitoring occasions in time. In some embodiments, wherein the processor is further configured to monitor for the occupancy indication signal by monitoring for a first occupancy indication signal associated with a first TXOP in the first channel during a channel monitoring occasion of the first set of channel monitoring occasions; and switching to monitor for a second occupancy indication signal associated with a second TXOP in the second channel during a channel monitoring occasion of the second set of channel monitoring occasions when there is no first occupancy indication signal detected in the first channel during the channel monitoring occasion. In some embodiments, wherein the processor is further configured to detect a first occupancy indication signal associated with a first TXOP in the first channel based on the monitoring. In some embodiments, wherein the transceiver is further configured to communicate, with the first wireless communication device in the first channel, a communication signal during the first TXOP after the detection. In some embodiments, wherein the first occupancy indication signal includes at least one of a preamble signal, a demodulation reference signal (DMRS), downlink control information (DCI), or timing information associated with the first TXOP. In some embodiments, wherein the first occupancy indication signal includes the timing information associated with the first TXOP, and wherein the processor is further configured to switch, after the detection, to monitor the second channel for a second occupancy indication signal associated with a second TXOP in the second channel based on the timing information. In some embodiments, wherein the transceiver is further configured to receive a channel switching timer configuration, and wherein the processor is further configured to switch, after the detection, to monitor the second channel for a second occupancy indication signal associated with a second TXOP based on the channel switching timer configuration. In some embodiments, wherein the transceiver is further configured to transmit, to the first wireless communication device in the first channel based on the detection, a report indicating the detection. In some embodiments, wherein the transceiver is further configured to receive, from the first wireless communication device, an instruction to switch to the second channel; and communicate, with the first wireless communication device in the second channel, a communication signal based on the received instruction.

Further embodiments of the present disclosure include a non-transitory computer-readable medium having program code recorded thereon, the program code comprising code for causing a first wireless communication device to transmit a first configuration indicating a first set of channel monitoring occasions for a first channel and a second set of channel monitoring occasions for a second channel; code for causing the first wireless communication device to transmit, in the first channel based on at least a listen-before-talk (LBT) in the first channel, a first occupancy indication signal indicating a beginning of a first transmission opportunity (TXOP) in the first channel; and code for causing the first wireless communication device to transmit, in the first channel based on the first configuration, a second occupancy indication signal associated with the first TXOP in the first channel during a channel monitoring occasion of the first set of channel monitoring occasions within the first TXOP.

In some embodiments, wherein the first set of channel monitoring occasions interleaves with the second set of channel monitoring occasions in time. In some embodiments, wherein the code for causing the first wireless communication device to transmit the first occupancy indication signal is further configured to transmit the first occupancy indication signal at the beginning of the first TXOP outside of the first set of channel monitoring occasions. In some embodiments, the non-transitory computer-readable medium further comprises code for causing the first wireless communication device to communicate, with a second wireless communication device in the first channel, a first communication signal during the first TXOP after transmitting the second occupancy indication signal. In some embodiments, the non-transitory computer-readable medium further comprises code for causing the first wireless communication device to communicate, with a third wireless communication device different from the second wireless communication device in the first channel, a second communication signal during the first TXOP before transmitting the second occupancy indication signal. In some embodiments, the non-transitory computer-readable medium further comprises code for causing the first wireless communication device to transmit, in the second channel based on at least an LBT in the second channel, a third occupancy indication signal indicating a beginning of a second TXOP in the second channel; and code for causing the first wireless communication device to transmit, in the second channel based on the first configuration, a fourth occupancy indication signal during a channel monitoring occasion of the second set of channel monitoring occasions within the second TXOP. In some embodiments, the non-transitory computer-readable medium further comprises code for causing the first wireless communication device to receive, from a second wireless communication device in the second channel, a report indicating a detection of the second TXOP based on at least one of the third occupancy indication signal or the fourth occupancy indication signal. In some embodiments, the non-transitory computer-readable medium further comprises code for causing the first wireless communication device to transmit, to the second wireless communication device, an instruction to switch to the first channel; and code for causing the first wireless communication device to communicate, with the second wireless communication device, a communication signal in the first channel based on the instruction. In some embodiments, wherein at least one of the first occupancy indication signal or the second occupancy indication signal includes at least one of a preamble signal, a demodulation reference signal (DMRS), downlink control information (DCI), or timing information associated with the first TXOP. In some embodiments, the non-transitory computer-readable medium further comprises code for causing the first wireless communication device to transmit a timer configuration for switching channel monitoring from the first channel to the second channel. In some embodiments, the non-transitory computer-readable medium further comprises code for causing the first wireless communication device to transmit a second configuration indicating a third set of channel monitoring occasions in the first channel different from the first set of channel monitoring occasions, the second configuration and the first configuration designated for different wireless communication devices; and code for causing the first wireless communication device to transmit, in the first channel based on the second configuration, a third occupancy indication signal during a channel monitoring occasion of the third set of channel monitoring occasions within the first TXOP.

Further embodiments of the present disclosure include a non-transitory computer-readable medium having program code recorded thereon, the program code comprising code for causing a first wireless communication device to receive, from a second wireless communication device, a configuration indicating a first set of channel monitoring occasions for a first channel and a second set of channel monitoring occasions for a second channel; and code for causing the first wireless communication device to monitor for an occupancy indication signal associated with a transmission opportunity (TXOP) in at least one of the first channel or the second channel during one or more channel monitoring occasions of the first set of channel monitoring occasions and the second set of channel monitoring occasions based on the configuration.

In some embodiments, wherein the first set of channel monitoring occasions interleaves with the second set of channel monitoring occasions in time. In some embodiments, wherein the code for causing the first wireless communication device to monitor the occupancy indication signal is further configured to monitor for a first occupancy indication signal associated with a first TXOP in the first channel during a channel monitoring occasion of the first set of channel monitoring occasions; and switch to monitor for a second occupancy indication signal associated with a second TXOP in the second channel during a channel monitoring occasion of the second set of channel monitoring occasions when there is no first occupancy indication signal detected in the first channel during the channel monitoring occasion. In some embodiments, the non-transitory computer-readable medium further comprises code for causing the first wireless communication device to detect a first occupancy indication signal associated with a first TXOP in the first channel based on the monitoring. In some embodiments, the non-transitory computer-readable medium further comprises code for causing the first wireless communication device to communicate, with the second wireless communication device in the first channel, a communication signal during the first TXOP after the detection. In some embodiments, wherein the first occupancy indication signal includes at least one of a preamble signal, a demodulation reference signal (DMRS), downlink control information (DCI), or timing information associated with the first TXOP. In some embodiments, wherein the first occupancy indication signal includes the timing information associated with the first TXOP, and wherein the non-transitory computer-readable medium further comprises code for causing the first wireless communication device to switch, after the detection, to monitor the second channel for a second occupancy indication signal associated with a second TXOP in the second channel based on the timing information. In some embodiments, the non-transitory computer-readable medium further comprises code for causing the first wireless communication device to receive a channel switching timer configuration; and code for causing the first wireless communication device to switch, after the detection, to monitor the second channel for a second occupancy indication signal associated with a second TXOP based on the channel switching timer configuration. In some embodiments, the non-transitory computer-readable medium further comprises code for causing the first wireless communication device to transmit, to the second wireless communication device in the first channel based on the detection, a report indicating the detection. In some embodiments, the non-transitory computer-readable medium further comprises code for causing the first wireless communication device to receive, from the second wireless communication device, an instruction to switch to the second channel; and code for causing the first wireless communication device to communicate, with the second wireless communication device in the second channel, a communication signal based on the received instruction.

Further embodiments of the present disclosure include an apparatus comprising means for transmitting a first configuration indicating a first set of channel monitoring occasions for a first channel and a second set of channel monitoring occasions for a second channel; means for transmitting, in the first channel based on at least a listen-before-talk (LBT) in the first channel, a first occupancy indication signal indicating a beginning of a first transmission opportunity (TXOP) in the first channel; and means for transmitting, in the first channel based on the first configuration, a second occupancy indication signal associated with the first TXOP in the first channel during a channel monitoring occasion of the first set of channel monitoring occasions within the first TXOP.

In some embodiments, wherein the first set of channel monitoring occasions interleaves with the second set of channel monitoring occasions in time. In some embodiments, wherein the means for transmitting the first occupancy indication signal is further configured to transmit the first occupancy indication signal at the beginning of the first TXOP outside of the first set of channel monitoring occasions. In some embodiments, the apparatus further comprises means for communicating, with a first wireless communication device in the first channel, a first communication signal during the first TXOP after transmitting the second occupancy indication signal. In some embodiments, the apparatus further comprises means for communicating, with a third wireless communication device different from the first wireless communication device in the first channel, a second communication signal during the first TXOP before transmitting the second occupancy indication signal. In some embodiments, the apparatus further comprises means for transmitting, in the second channel based on at least an LBT in the second channel, a third occupancy indication signal indicating a beginning of a second TXOP in the second channel; and means for transmitting, in the second channel based on the first configuration, a fourth occupancy indication signal during a channel monitoring occasion of the second set of channel monitoring occasions within the second TXOP. In some embodiments, the apparatus further comprises means for receiving, from a first wireless communication device in the second channel, a report indicating a detection of the second TXOP based on at least one of the third occupancy indication signal or the fourth occupancy indication signal. In some embodiments, the apparatus further comprises means for transmitting, to the first wireless communication device, an instruction to switch to the first channel; and means for communicating, with the first wireless communication device, a communication signal in the first channel based on the instruction. In some embodiments, wherein at least one of the first occupancy indication signal or the second occupancy indication signal includes at least one of a preamble signal, a demodulation reference signal (DMRS), downlink control information (DCI), or timing information associated with the first TXOP. In some embodiments, the apparatus further comprises means for transmitting a timer configuration for switching channel monitoring from the first channel to the second channel. In some embodiments, the apparatus further comprises means for transmitting a second configuration indicating a third set of channel monitoring occasions in the first channel different from the first set of channel monitoring occasions, the second configuration and the first configuration designated for different wireless communication devices; and means for transmitting, in the first channel based on the second configuration, a third occupancy indication signal during a channel monitoring occasion of the third set of channel monitoring occasions within the first TXOP.

Further embodiments of the present disclosure include an apparatus comprising means for receiving, from a first wireless communication device, a configuration indicating a first set of channel monitoring occasions for a first channel and a second set of channel monitoring occasions for a second channel; and means for monitoring for an occupancy indication signal associated with a transmission opportunity (TXOP) in at least one of the first channel or the second channel during one or more channel monitoring occasions of the first set of channel monitoring occasions and the second set of channel monitoring occasions based on the configuration. In some embodiments, wherein the first set of channel monitoring occasions interleaves with the second set of channel monitoring occasions in time. In some embodiments, wherein the means for monitoring the occupancy indication signal is further configured to monitor for a first occupancy indication signal associated with a first TXOP in the first channel during a channel monitoring occasion of the first set of channel monitoring occasions; and switch to monitor for a second occupancy indication signal associated with a second TXOP in the second channel during a channel monitoring occasion of the second set of channel monitoring occasions when there is no first occupancy indication signal detected in the first channel during the channel monitoring occasion. In some embodiments, the apparatus further comprises means for detecting a first occupancy indication signal associated with a first TXOP in the first channel based on the monitoring. In some embodiments, the apparatus further comprises means for communicating, with the first wireless communication device in the first channel, a communication signal during the first TXOP after the detecting. In some embodiments, wherein the first occupancy indication signal includes at least one of a preamble signal, a demodulation reference signal (DMRS), downlink control information (DCI), or timing information associated with the first TXOP. In some embodiments, wherein the first occupancy indication signal includes the timing information associated with the first TXOP, and wherein the apparatus further comprises means for switching, after the detection, to monitor the second channel for a second occupancy indication signal associated with a second TXOP in the second channel based on the timing information. In some embodiments, the apparatus further comprises means for receiving a channel switching timer configuration; and means for switching, after the detection, to monitor the second channel for a second occupancy indication signal associated with a second TXOP based on the channel switching timer configuration. In some embodiments, the apparatus further comprises means for transmitting, to the first wireless communication device in the first channel based on the detecting, a report indicating the detection. In some embodiments, the apparatus further comprises means for receiving, from the first wireless communication device, an instruction to switch to the second channel; and means for communicating, with the first wireless communication device in the second channel, a communication signal based on the received instruction.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a first wireless communication device, a first configuration indicating a first set of channel monitoring occasions for a first channel and a second set of channel monitoring occasions for a second channel;
   transmitting, by the first wireless communication device in the first channel based on at least a listen-before-talk (LBT) in the first channel, a first occupancy indication signal indicating a first transmission opportunity (TXOP) in the first channel;
   transmitting, by the first wireless communication device in the first channel based on the first configuration, a second occupancy indication signal associated with the first TXOP in the first channel during a channel monitoring occasion of the first set of channel monitoring occasions within the first TXOP;
   transmitting, by the first wireless communication device in the second channel based on at least an LBT in the second channel, a third occupancy indication signal indicating a second TXOP in the second channel; and
   transmitting, by the first wireless communication device in the second channel based on the first configuration, a fourth occupancy indication signal during a channel monitoring occasion of the second set of channel monitoring occasions within the second TXOP.

2. The method of claim 1, wherein the first set of channel monitoring occasions interleaves with the second set of channel monitoring occasions in time.

3. The method of claim 1, wherein the transmitting the first occupancy indication signal includes:
   transmitting, by the first wireless communication device, the first occupancy indication signal during the first TXOP outside of the first set of channel monitoring occasions.

4. The method of claim 1, further comprising:
   receiving, by the first wireless communication device from a second wireless communication device in the second channel, a report indicating a detection of the first TXOP based on at least one of the first occupancy indication signal or the second occupancy indication signal;
   transmitting, by the first wireless communication device to the second wireless communication device in response to the report, an instruction to switch to the second channel; and
   communicating, by the first wireless communication device with the second wireless communication device, a communication signal in the second channel based on the instruction.

5. The method of claim 1, wherein at least one of the first occupancy indication signal or the second occupancy indication signal includes at least one of a preamble signal, a demodulation reference signal (DMRS), downlink control information (DCI), or timing information associated with the first TXOP.

6. The method of claim 1, further comprising:
   communicating, by the first wireless communication device with a second wireless communication device in the first channel, a first communication signal during the first TXOP after transmitting the second occupancy indication signal.

7. The method of claim 6, further comprising switching, by the first wireless communication device, to communicate with the second wireless communication device in the second channel after communicating the first communication signal in the first channel based on at least one of timing information associated with the first TXOP or a channel switching timer configuration.

8. The method of claim 1, further comprising:
transmitting, by the first wireless communication device, a second configuration indicating a third set of channel monitoring occasions in the first channel different from the first set of channel monitoring occasions, the second configuration and the first configuration designated for different wireless communication devices; and
transmitting, by the first wireless communication device in the first channel based on the second configuration, a fifth occupancy indication signal during a channel monitoring occasion of the third set of channel monitoring occasions within the first TXOP.

9. A method of wireless communication, comprising:
receiving, by a first wireless communication device from a second wireless communication device, a configuration indicating a first set of channel monitoring occasions for a first channel and a second set of channel monitoring occasions for a second channel; and
monitoring, by the first wireless communication device, for an occupancy indication signal associated with a transmission opportunity (TXOP) in at least one of the first channel or the second channel during one or more channel monitoring occasions of the first set of channel monitoring occasions and the second set of channel monitoring occasions based on the configuration, wherein the monitoring includes:
monitoring, by the first wireless communication device, for a first occupancy indication signal associated with a first TXOP in the first channel during a channel monitoring occasion of the first set of channel monitoring occasions; and
switching, by the first wireless communication device, to monitor for a second occupancy indication signal associated with a second TXOP in the second channel during a channel monitoring occasion of the second set of channel monitoring occasions when there is no first occupancy indication signal detected in the first channel during the channel monitoring occasion of the first set of channel monitoring occasions.

10. The method of claim 9, wherein the first set of channel monitoring occasions interleaves with the second set of channel monitoring occasions in time.

11. The method of claim 9, further comprising:
detecting, by the first wireless communication device, the second occupancy indication signal associated with the second TXOP in the second channel based on the monitoring; and
communicating, by the first wireless communication device with the second wireless communication device in the second channel, a communication signal during the second TXOP after the detecting.

12. The method of claim 9, further comprising:
detecting, by the first wireless communication device, the second occupancy indication signal associated with the second TXOP in the second channel based on the monitoring,
wherein the second occupancy indication signal includes at least one of a preamble signal, a demodulation reference signal (DMRS), downlink control information (DCI), or timing information associated with the second TXOP.

13. The method of claim 9, further comprising:
detecting, by the first wireless communication device, the second occupancy indication signal associated with the second TXOP in the second channel based on the monitoring; and
switching, by the first wireless communication device after the detecting, to monitor the first channel for a third occupancy indication signal associated with a third TXOP in the first channel based on at least one of:
timing information associated with the second TXOP indicated by the second occupancy indication signal; or
a channel switching timer configuration.

14. The method of claim 9, further comprising:
detecting, by the first wireless communication device, the second occupancy indication signal associated with the second TXOP in the second channel based on the monitoring;
transmitting, by the first wireless communication device to the second wireless communication device in the second channel based on the detecting, a report indicating the detection;
receiving, by the first wireless communication device from the second wireless communication device, an instruction to switch to the first channel; and
communicating, by the first wireless communication device with the second wireless communication device in the first channel, a communication signal based on the received instruction.

15. An apparatus comprising:
a transceiver configured to:
transmit a first configuration indicating a first set of channel monitoring occasions for a first channel and a second set of channel monitoring occasions for a second channel;
transmit, in the first channel based on at least a listen-before-talk (LBT) in the first channel, a first occupancy indication signal indicating a first transmission opportunity (TXOP) in the first channel;
transmit, in the first channel based on the first configuration, a second occupancy indication signal associated with the first TXOP in the first channel during a channel monitoring occasion of the first set of channel monitoring occasions within the first TXOP;
transmit, in the second channel based on at least an LBT in the second channel, a third occupancy indication signal indicating a second TXOP in the second channel; and
transmit, in the second channel based on the first configuration, a fourth occupancy indication signal during a channel monitoring occasion of the second set of channel monitoring occasions within the second TXOP.

16. The apparatus of claim 15, wherein the first set of channel monitoring occasions interleaves with the second set of channel monitoring occasions in time.

17. The apparatus of claim 15, wherein the transceiver is further configured to:
receive, from a first wireless communication device in the first channel, a report indicating a detection of the first TXOP based on at least one of the first occupancy indication signal or the second occupancy indication signal; and
transmit, to the first wireless communication device in response to the report, an instruction to switch to the second channel; and
communicate, with the first wireless communication device, a communication signal in the second channel based on the instruction.

18. The apparatus of claim 15, wherein at least one of the first occupancy indication signal or the second occupancy indication signal includes at least one of a preamble signal, a demodulation reference signal (DMRS), downlink control information (DCI), or timing information associated with the first TXOP.

19. The apparatus of claim 15, wherein the transceiver is further configured to:
communicate, with a first wireless communication device in the first channel, a first communication signal during the first TXOP after transmitting the second occupancy indication signal.

20. The apparatus of claim 19, wherein the transceiver is further configured to:
switch to communicate with the first wireless communication device in the second channel after communicating the first communication signal in the first channel based on at least one of timing information associated with the first TXOP or a channel switching timer configuration.

21. The apparatus of claim 15, wherein the transceiver is further configured to:
transmit a second configuration indicating a third set of channel monitoring occasions in the first channel different from the first set of channel monitoring occasions, the second configuration and the first configuration designated for different wireless communication devices; and
transmit, in the first channel based on the second configuration, a fifth occupancy indication signal during a channel monitoring occasion of the third set of channel monitoring occasions within the first TXOP.

22. An apparatus comprising:
a transceiver configured to receive, from a first wireless communication device, a configuration indicating a first set of channel monitoring occasions for a first channel and a second set of channel monitoring occasions for a second channel; and
a processor configured to monitor for an occupancy indication signal associated with a transmission opportunity (TXOP) in at least one of the first channel or the second channel during one or more channel monitoring occasions of the first set of channel monitoring occasions and the second set of channel monitoring occasions based on the configuration, wherein the processor configured to monitor for the occupancy indication signal is further configured to:
monitor for a first occupancy indication signal associated with a first TXOP in the first channel during a channel monitoring occasion of the first set of channel monitoring occasions; and
switch to monitor for a second occupancy indication signal associated with a second TXOP in the second channel during a channel monitoring occasion of the second set of channel monitoring occasions when there is no first occupancy indication signal detected in the first channel during the channel monitoring occasion of the first set of channel monitoring occasions.

23. The apparatus of claim 22, wherein the first set of channel monitoring occasions interleaves with the second set of channel monitoring occasions in time.

24. The apparatus of claim 22, wherein the processor is further configured to:
detect the second occupancy indication signal associated with the second TXOP in the second channel based on the monitoring, the second occupancy indication signal including at least one of a preamble signal, a demodulation reference signal (DMRS), downlink control information (DCI), or timing information associated with the second TXOP.

25. The apparatus of claim 22, wherein the processor is further configured to:
detect the second occupancy indication signal associated with the second TXOP in the second channel based on the monitoring; and
switch, after the detection, to monitor the first channel for a third occupancy indication signal associated with a third TXOP in the first channel based on at least one of
timing information associated with the second TXOP indicated by the second occupancy indication signal; or
a channel switching timer configuration.

26. The apparatus of claim 22, wherein:
the processor is further configured to:
detect the second occupancy indication signal associated with the second TXOP in the second channel based on the monitoring; and
the transceiver is further configured to:
transmit, to the first wireless communication device in the second channel based on the detection, a report indicating the detection;
receive, from the first wireless communication device in response to the report, an instruction to switch to the first channel; and
communicate, with the first wireless communication device in the first channel, a communication signal based on the received instruction.

* * * * *